US010609763B2

(12) United States Patent
Jin et al.

(10) Patent No.: US 10,609,763 B2
(45) Date of Patent: Mar. 31, 2020

(54) METHOD FOR ACCESSING NETWORK BY USER EQUIPMENT, CORE NETWORK ENTITY, BASE STATION, AND FIRST UE

(71) Applicant: Huawei Technologies Co., Ltd., Shenzhen (CN)

(72) Inventors: Hui Jin, Beijing (CN); Xiangdong Zhang, Beijing (CN); Shulan Feng, Beijing (CN); Da Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/066,028

(22) PCT Filed: Dec. 31, 2015

(86) PCT No.: PCT/CN2015/100339
§ 371 (c)(1),
(2) Date: Jun. 25, 2018

(87) PCT Pub. No.: WO2017/113409
PCT Pub. Date: Jul. 6, 2017

(65) Prior Publication Data
US 2019/0021135 A1    Jan. 17, 2019

(51) Int. Cl.
| | |
|---|---|
| *H04W 88/04* | (2009.01) |
| *H04W 76/11* | (2018.01) |
| *H04W 76/14* | (2018.01) |
| *H04W 12/06* | (2009.01) |
| *H04W 56/00* | (2009.01) |
| *H04W 72/08* | (2009.01) |

(Continued)

(52) U.S. Cl.
CPC .......... *H04W 88/04* (2013.01); *H04W 12/06* (2013.01); *H04W 56/0005* (2013.01); *H04W 72/087* (2013.01); *H04W 76/11* (2018.02); *H04W 76/14* (2018.02); *H04W 76/15* (2018.02); *H04W 76/27* (2018.02)

(58) Field of Classification Search
None
See application file for complete search history.

(56) References Cited

U.S. PATENT DOCUMENTS

| | | | |
|---|---|---|---|
| 2013/0210384 A1* | 8/2013 | Zhang | H04W 76/12 455/410 |
| 2014/0128068 A1 | 5/2014 | Klein et al. | |
| 2016/0150513 A1 | 5/2016 | Wu et al. | |

(Continued)

FOREIGN PATENT DOCUMENTS

| | | |
|---|---|---|
| CN | 102724666 A | 10/2012 |
| CN | 103518419 A | 1/2014 |

(Continued)

*Primary Examiner* — Kodzovi Acolatse
(74) *Attorney, Agent, or Firm* — Slater Matsil, LLP

(57) ABSTRACT

In an embodiment, the present invention discloses a method for accessing a network by UE, a core network entity, a base station, and first UE. The method includes determining, by a base station, that first UE provides relay for the second UE; and sending, by the base station, a first message including a first identifier to the first UE. The first message is used to manage a data radio bearer DRB of the first UE so that the DRB of the first UE is used to transmit data of the second UE, and the first identifier is in a one-to-one correspondence with the second UE.

19 Claims, 22 Drawing Sheets

(51) Int. Cl.
*H04W 76/15* (2018.01)
*H04W 76/27* (2018.01)

(56) References Cited

U.S. PATENT DOCUMENTS

| | | | |
|---|---|---|---|
| 2016/0286459 A1 | 9/2016 | Enomoto et al. | |
| 2016/0381720 A1* | 12/2016 | Baek | H04W 8/14 |
| | | | 370/329 |
| 2017/0111754 A1* | 4/2017 | Baghel | H04W 4/70 |
| 2017/0302360 A1* | 10/2017 | Aminaka | H04W 80/02 |
| 2017/0317740 A1* | 11/2017 | Basu Mallick | H04B 7/15557 |
| 2018/0048986 A1* | 2/2018 | Adachi | H04W 8/00 |
| 2018/0069618 A1* | 3/2018 | Loehr | H04B 7/15542 |
| 2018/0124633 A1* | 5/2018 | Hwang | H04W 28/02 |
| 2018/0199301 A1* | 7/2018 | Hori | H04W 4/10 |
| 2018/0213577 A1* | 7/2018 | Burbidge | H04W 76/10 |
| 2018/0234942 A1* | 8/2018 | Kim | H04W 68/02 |
| 2018/0248919 A1* | 8/2018 | Gustafsson | H04L 63/306 |
| 2018/0255499 A1* | 9/2018 | Loehr | H04B 7/2606 |

FOREIGN PATENT DOCUMENTS

| | | |
|---|---|---|
| CN | 104349471 A | 2/2015 |
| EP | 2833694 A2 | 2/2015 |
| WO | 2015068731 A1 | 5/2015 |

* cited by examiner

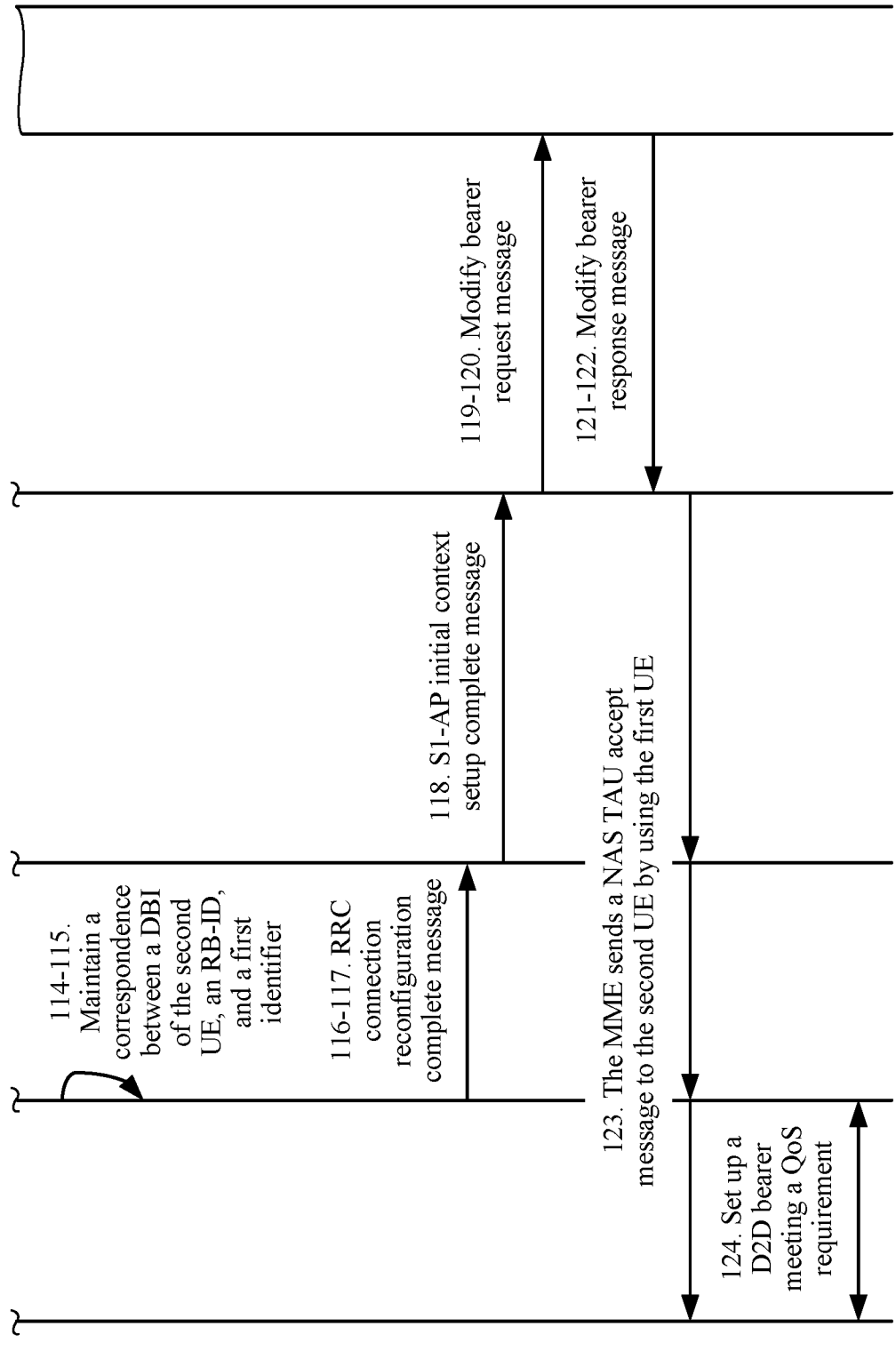

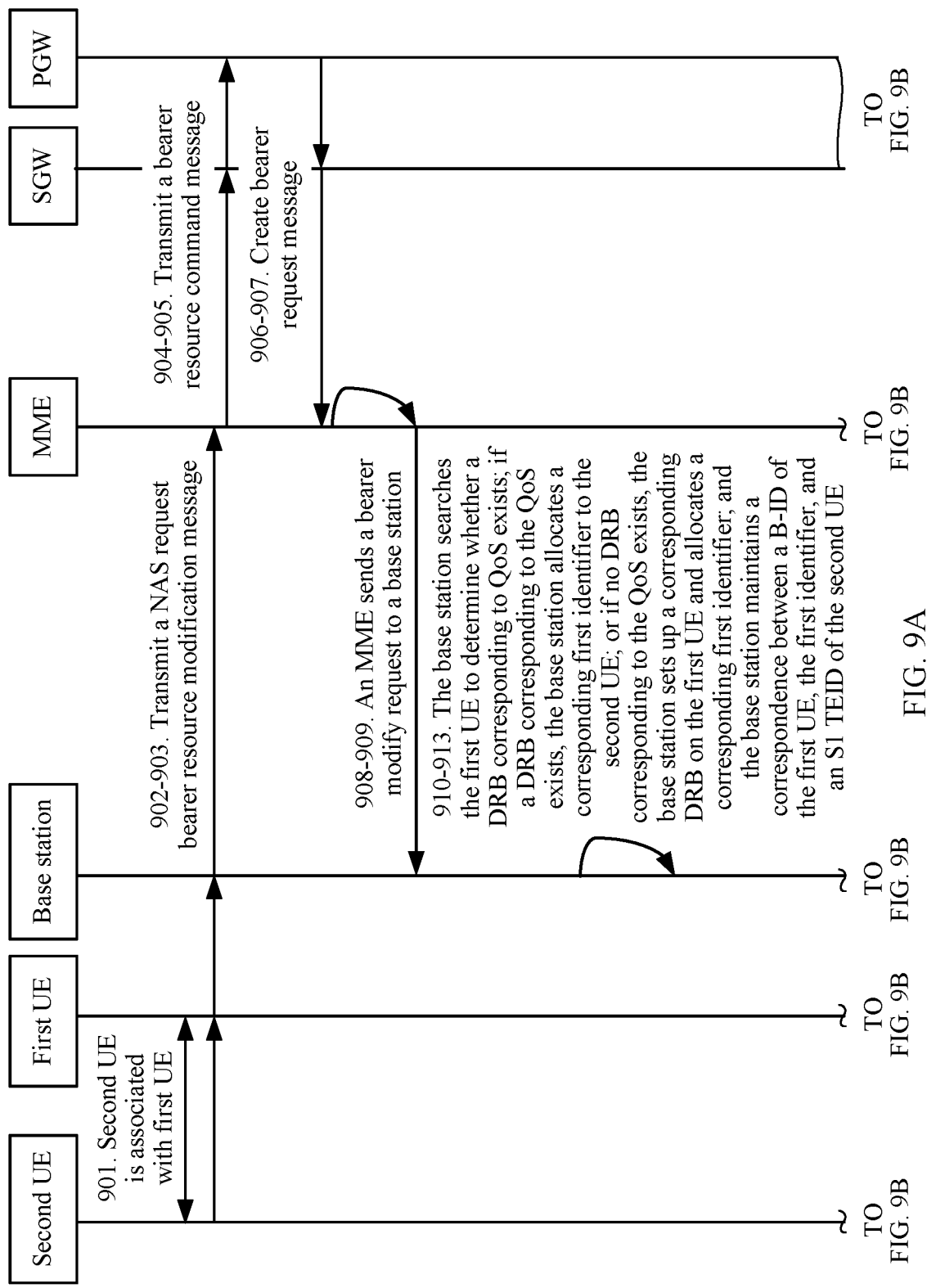

METHOD FOR ACCESSING NETWORK BY USER EQUIPMENT, CORE NETWORK ENTITY, BASE STATION, AND FIRST UE

CROSS-REFERENCE TO RELATED APPLICATION

This application is a National Stage of International Application No. PCT/CN2015/100339, filed Dec. 31, 2015, which is hereby incorporated by reference in their entirety.

TECHNICAL FIELD

The present invention relates to the field of communications technologies, and in particular, to a method for accessing a network by user equipment (UE), a core network entity, a base station, and first UE.

BACKGROUND

With continuous development of communications technologies, intelligent user equipment such as a wearable device is one of strategic directions for future development of each provider.

The wearable device is portable user equipment that is directly worn on a body or integrated into clothing or an accessory of a user. The wearable device is not merely a hardware device, and further implements a powerful function by using software support, data exchange, or cloud interaction. For example, a watch on which a subscriber identity module (SIM) can be installed is currently launched in the industry, so that the watch can be directly connected to a network. It is a future development trend that a future wearable device is directly connected to a network.

Due to a size limitation of the wearable device, a battery and an antenna of the wearable device are main problems affecting the wearable device. Due to a small battery capacity, if the wearable device directly communicates with a base station, the battery is quickly consumed and a standby time is short. Because wearable devices generally have special shapes, it is difficult to design an antenna. Currently, only a single antenna can be implemented, and therefore the wearable device needs to consume more time and more network resources to send a same volume of data than a multi-antenna device.

Currently, if the wearable device wants to access a network, the wearable device may access the network by using an intelligent terminal such as a smartphone, so that energy consumption of the wearable device can be reduced. When the wearable device accesses the network by using the intelligent terminal, the intelligent terminal separately allocates one or more data radio bearers (DRB) to the wearable device. The DRB may be used to carry data of the wearable device. However, each DRB can support only one type of specific quality of service (QoS), and one intelligent terminal can have a maximum of eight DRBs. Therefore, when there are a plurality of services with different types of QoS on the wearable device, UE needs to allocate a plurality of independent DRBs to the wearable device. As a result, each intelligent terminal can bear a relatively small quantity of wearable devices.

SUMMARY

The present invention provides a method for accessing a network by UE, a core network entity, a base station, and first UE, so as to reduce energy consumption of second UE, and increase a quantity of second UEs that can be borne by first UE.

According to a first aspect, a method for accessing a network by user equipment UE is provided, where the method includes: determining, by a base station, that first UE provides relay for the second UE; and sending, by the base station, a first message including a first identifier to the first UE, where the first message is used to manage a data radio bearer DRB of the first UE, so that the DRB of the first UE is used to transmit data of the second UE, and the first identifier is in a one-to-one correspondence with the second UE.

With reference to the first aspect, in a first possible implementation of the first aspect, that the first identifier is in a one-to-one correspondence with the second UE includes: the first identifier is used to indicate that data transmitted by using the DRB of the first UE belongs to the second UE, or the first identifier is used to identify the second UE.

With reference to the first aspect or the first possible implementation of the first aspect, in a second possible implementation of the first aspect, before the sending, by the base station, a first message including a first identifier to the first UE, the method further includes: receiving, by the base station, a second message that is sent by a first core network entity and that is used to manage a bearer of the second UE, and obtaining, by the base station according to the second message, quality of service QoS of a DRB that needs to be used by the second UE; and when the base station determines that a DRB meeting the QoS requirement exists in the first UE, determining, by the base station, to modify the DRB meeting the QoS requirement in the first UE, so that the DRB of the first UE is used to transmit data of the second UE; or when the base station determines that no DRB meeting the QoS requirement exists in the first UE, setting up, by the base station on the first UE, a DRB meeting the QoS requirement.

With reference to the first aspect or the first possible implementation of the first aspect, in a third possible implementation of the first aspect, before the sending, by the base station, a first message including a first identifier to the first UE, the method further includes: allocating, by the base station, the first identifier to the second UE; or receiving, by the base station, a third message that is sent by a first core network entity and that includes the first identifier, and obtaining, by the base station, the first identifier from the received third message.

With reference to any one of the first aspect, or the first to the third possible implementations of the first aspect, in a fourth possible implementation of the first aspect, after the sending, by the base station, a first message including a first identifier to the first UE, the method further includes: receiving, by the base station, data that is sent by using the DRB of the first UE, obtaining, by the base station, an S1 bearer that is of the second UE and that is corresponding to the DRB and the first identifier, and sending, by the base station, the data to a second core network entity by using the S1 bearer; or receiving, by the base station, data that is sent by the second core network entity to the second UE by using an S1 bearer of the second UE, obtaining, by the base station, the first identifier and the DRB of the first UE that are corresponding to the S1 bearer, and sending, by the base station, the data by using the DRB of the first UE, where a PDU carrying the data that is sent by using the DRB of the first UE includes the first identifier.

With reference to the fourth possible implementation of the first aspect, in a fifth possible implementation of the first aspect, the obtaining, by the base station, the first identifier and the DRB of the first UE that are corresponding to the S1 bearer includes: obtaining, by the base station by using a stored first correspondence, the first identifier and the DRB of the first UE that are corresponding to the S1 bearer, where the first correspondence includes an identifier of the DRB of the first UE, the first identifier, and an identifier of the S1 bearer of the second UE, the identifier of the DRB of the first UE is used to identify the DRB of the first UE, and the identifier of the S1 bearer of the second UE is used to identify the S1 bearer of the second UE.

With reference to the fourth possible implementation of the first aspect, in a sixth possible implementation of the first aspect, the obtaining, by the base station, an S1 bearer that is of the second UE and that is corresponding to the DRB and the first identifier includes: obtaining, by the base station by using a stored first correspondence, the S1 bearer that is of the second UE and that is corresponding to the DRB and the first identifier, where the first correspondence includes an identifier of the DRB of the first UE, the first identifier, and an identifier of the S1 bearer of the second UE, the identifier of the DRB of the first UE is used to identify the DRB of the first UE, and the identifier of the S1 bearer of the second UE is used to identify the S1 bearer of the second UE.

With reference to the first aspect, in a seventh possible implementation of the first aspect, the base station determines, in one of the following manners, that the first UE provides relay for the second UE: receiving, by the base station, a second message that is sent by a first core network entity and that is used to manage a bearer of the second UE, where the second message includes an identifier of the first UE; and determining, by the base station according to the identifier of the first UE, that the first UE provides relay for the second UE; receiving, by the base station, a second message that is sent by a first core network entity and that is used to manage a bearer of the second UE, where the second message includes an identifier of the first UE and a first indication; and determining, by the base station according to the identifier of the first UE and the first indication, that the first UE provides relay for the second UE, where the first indication is used to instruct the second UE to access a network by using a relay; or storing, by the base station, information that the first UE provides relay for the second UE, and determining, by the base station according to the information, that the first UE provides relay for the second UE.

With reference to the seventh possible implementation of the first aspect, in an eighth possible implementation of the first aspect, the storing, by the base station, information that the first UE provides relay for the second UE includes: receiving, by the base station, a signaling message that is sent by using a signaling radio bearer SRB of the first UE, where a PDU carrying the signaling message includes a second identifier, and the second identifier is used to indicate that a signaling message transmitted in the SRB of the first UE belongs to the second UE; and determining, by the base station according to the second identifier, that the first UE provides relay for the second UE, and storing the information that the first UE provides relay for the second UE.

With reference to the eighth possible implementation of the first aspect, in a ninth possible implementation of the first aspect, before the receiving, by the base station, a signaling message that is sent by the second UE by using an SRB of the first UE, the method further includes: receiving, by the base station, a message that is sent by the first UE and that is used by the first UE to request the base station to allocate the second identifier to the second UE, allocating, by the base station, the second identifier to the second UE, and sending, by the base station, a message including the second identifier to the first UE.

With reference to the first aspect or the first possible implementation of the first aspect, in a tenth possible implementation of the first aspect, the sending, by the base station, a first message including a first identifier to the first UE includes: sending, by the base station, the first message including the first identifier to the first UE, where the first message further includes an identifier that is used to identify a communications link between the first UE and the second UE, so that the first UE stores a second correspondence, and the second correspondence includes an identifier of the DRB of the first UE, the first identifier, and the identifier that is used to identify the communications link between the first UE and the second UE.

With reference to any one of the first aspect, or the first to the tenth possible implementations of the first aspect, in an eleventh possible implementation of the first aspect, the first identifier includes one of the following identifiers: a Packet Data Convergence Protocol identifier PDCP ID, a Radio Link Control identifier RLC ID, or a Media Access Control identifier MAC ID.

With reference to any one of the first aspect, or the first to the tenth possible implementations of the first aspect, in a twelfth possible implementation of the first aspect, the second identifier includes one of the following identifiers: a PDCP ID, an RLC ID, or a MAC ID.

According to a second aspect, a method for accessing a network by user equipment UE is provided, where the method includes: receiving, by a first core network entity, a message that is sent by first UE and that is used to request to enter a connected state from an idle state; and sending, by the first core network entity, a second message to the base station when the first core network entity determines that the first UE provides relay for second UE, where the second message is used to manage a bearer of the second UE, and the second message includes context information of the bearer of the second UE.

With reference to the second aspect, in a first possible implementation of the second aspect, the receiving, by a first core network entity, a message that is sent by first UE and that is used to request to enter a connected state from an idle state includes: receiving, by the first core network entity, the message that is sent by the first UE and that is used to request to enter the connected state from the idle state, where the message that is used to request to enter the connected state from the idle state includes an identifier of the second UE; obtaining, by the first core network entity, the identifier of the second UE; and obtaining, by the first core network entity, the context information of the bearer of the second UE according to the identifier of the second UE.

With reference to the second aspect or the first possible implementation of the second aspect, in a second possible implementation of the second aspect, the sending, by the first core network entity, a second message to the base station includes: sending, by the first core network entity, the second message to the base station, where the second message includes an identifier of the first UE, and the identifier of the first UE is used by the base station to determine that the first UE provides relay for the second UE.

With reference to the second aspect or the first possible implementation of the second aspect, in a third possible implementation of the second aspect, the sending, by the first core network entity, a second message to the base station includes: sending, by the first core network entity, the second message to the base station, where the second message includes an identifier of the first UE and a first indication, the identifier of the first UE is used by the base station to determine that the first UE provides relay for the second UE, and the first indication is used to instruct the second UE to access a network by using a relay.

With reference to any one of the second aspect, or the first to the third possible implementations of the second aspect, in a fourth possible implementation of the second aspect, the sending, by the first core network entity, a second message to the base station includes: obtaining, by the first core network entity, a first identifier, and sending, by the first core network entity, a first message to the base station, where the first message includes the first identifier, and the first identifier is in a one-to-one correspondence with the second UE.

With reference to the fourth possible implementation of the second aspect, in a fifth possible implementation of the second aspect, that the first identifier is in a one-to-one correspondence with the second UE includes: the first identifier is used to indicate that data transmitted in a DRB of the first UE belongs to the second UE, or the first identifier is used to identify the second UE.

According to a third aspect, a base station is provided, where the base station includes: a processing unit, configured to determine that first UE provides relay for the second UE; and a sending unit, configured to send a first message including a first identifier to the first UE, where the first message is used to manage a data radio bearer DRB of the first UE, so that the DRB of the first UE is used to transmit data of the second UE, and the first identifier is in a one-to-one correspondence with the second UE.

With reference to the third aspect, in a first possible implementation of the third aspect, the first identifier sent by the sending unit is specifically used to indicate that data transmitted by using the DRB of the first UE belongs to the second UE, or the first identifier is used to identify the second UE.

With reference to the third aspect or the first possible implementation of the third aspect, in a second possible implementation of the third aspect, the base station further includes: a receiving unit, configured to receive a second message that is sent by a first core network entity and that is used to manage a bearer of the second UE; and the processing unit is further configured to: obtain, according to the second message, quality of service QoS of a DRB that needs to be used by the second UE; and when determining that a DRB meeting the QoS requirement exists in the first UE, determine to modify the DRB meeting the QoS requirement in the first UE, so that the DRB of the first UE is used to transmit data of the second UE; or when determining that no DRB meeting the QoS requirement exists in the first UE, set up, on the first UE, a DRB meeting the QoS requirement.

With reference to the third aspect or the first possible implementation of the third aspect, in a third possible implementation of the third aspect, the processing unit is further configured to: allocate the first identifier to the second UE; or receive a third message that is sent by a first core network entity and that includes the first identifier, and obtain the first identifier from the received third message.

With reference to any one of the third aspect, or the first to the third possible implementations of the third aspect, in a fourth possible implementation of the third aspect, the base station further includes: the receiving unit, configured to receive data that is sent by using the DRB of the first UE; the processing unit is specifically configured to obtain an S1 bearer that is of the second UE and that is corresponding to the DRB and the first identifier; and the sending unit is specifically configured to send the data to a second core network entity by using the S1 bearer; or the receiving unit, configured to receive data that is sent by the second core network entity to the second UE by using an S1 bearer of the second UE; the processing unit is specifically configured to obtain the first identifier and the DRB of the first UE that are corresponding to the S1 bearer; and the sending unit is specifically configured to send the data by using the DRB of the first UE, where a PDU carrying the data that is sent by using the DRB of the first UE includes the first identifier.

With reference to the fourth possible implementation of the third aspect, in a fifth possible implementation of the third aspect, the base station further includes: a memory, configured to store a first correspondence; and the processing unit is specifically configured to obtain, by using the stored first correspondence, the first identifier and the DRB of the first UE that are corresponding to the S1 bearer, where the first correspondence includes an identifier of the DRB of the first UE, the first identifier, and an identifier of the S1 bearer of the second UE, the identifier of the DRB of the first UE is used to identify the DRB of the first UE, and the identifier of the S1 bearer of the second UE is used to identify the S1 bearer of the second UE.

With reference to the fourth possible implementation of the third aspect, in a sixth possible implementation of the third aspect, the base station further includes: a memory, configured to store a first correspondence; and the processing unit is specifically configured to obtain, by using the stored first correspondence, the S1 bearer that is of the second UE and that is corresponding to the DRB and the first identifier, where the first correspondence includes an identifier of the DRB of the first UE, the first identifier, and an identifier of the S1 bearer of the second UE, the identifier of the DRB of the first UE is used to identify the DRB of the first UE, and the identifier of the S1 bearer of the second UE is used to identify the S1 bearer of the second UE.

With reference to the third aspect, in a seventh possible implementation of the third aspect, the processing unit is specifically configured to determine, in one of the following manners, that the first UE provides relay for the second UE: receiving a second message that is sent by a first core network entity and that is used to manage a bearer of the second UE, where the second message includes an identifier of the first UE; and determining, according to the identifier of the first UE, that the first UE provides relay for the second UE; receiving a second message that is sent by a first core network entity and that is used to manage a bearer of the second UE, where the second message includes an identifier of the first UE and a first indication; and determining, according to the identifier of the first UE and the first indication, that the first UE provides relay for the second UE, where the first indication is used to instruct the second UE to access a network by using a relay; or storing information that the first UE provides relay for the second UE, and determining, according to the information, that the first UE provides relay for the second UE.

With reference to the seventh possible implementation of the third aspect, in an eighth possible implementation of the third aspect, the processing unit is specifically configured to: receive a signaling message that is sent by using a signaling radio bearer SRB of the first UE, where a PDU carrying the signaling message includes a second identifier, and the second identifier is used to indicate that a signaling message transmitted in the SRB of the first UE belongs to the second UE; and determine, according to the second identifier, that the first UE provides relay for the second UE, and store the information that the first UE provides relay for the second UE.

With reference to the eighth possible implementation of the third aspect, in a ninth possible implementation of the third aspect, the base station further includes: a receiving unit, configured to receive a message that is sent by the first UE and that is used by the first UE to request the base station to allocate the second identifier to the second UE; the processing unit is further configured to allocate the second identifier to the second UE; and the sending unit is further configured to send a message including the second identifier to the first UE.

With reference to the third aspect or the first possible implementation of the third aspect, in a tenth possible implementation of the third aspect, the sending unit is specifically configured to send the first message including the first identifier to the first UE, where the first message further includes an identifier that is used to identify a communications link between the first UE and the second UE, so that the first UE stores a second correspondence, and the second correspondence includes an identifier of the DRB of the first UE, the first identifier, and the identifier that is used to identify the communications link between the first UE and the second UE.

With reference to any one of the third aspect, or the first to the tenth possible implementations of the third aspect, in an eleventh possible implementation of the third aspect, the first identifier sent by the sending unit includes one of the following identifiers: a Packet Data Convergence Protocol identifier PDCP ID, a Radio Link Control identifier RLC ID, or a Media Access Control identifier MAC ID.

With reference to any one of the third aspect, or the first to the tenth possible implementations of the third aspect, in a twelfth possible implementation of the third aspect, the second identifier determined by the processing unit includes one of the following identifiers: a PDCP ID, an RLC ID, or a MAC ID.

According to a fourth aspect, a first core network entity is provided, where the first core network entity includes: a receiving unit, configured to receive a message that is sent by first UE and that is used to request to enter a connected state from an idle state; a processing unit, configured to determine that the first UE provides relay for second UE; and a sending unit, configured to send a second message to the base station when it is determined that the first UE provides relay for the second UE, where the second message is used to manage a bearer of the second UE, and the second message includes context information of the bearer of the second UE.

With reference to the fourth aspect, in a first possible implementation of the fourth aspect, the receiving unit is specifically configured to: receive the message that is sent by the first UE and that is used to request to enter the connected state from the idle state, where the message that is used to request to enter the connected state from the idle state includes an identifier of the second UE; obtain the identifier of the second UE; and obtain the context information of the bearer of the second UE according to the identifier of the second UE.

With reference to the fourth aspect or the first possible implementation of the fourth aspect, in a second possible implementation of the fourth aspect, the sending unit is specifically configured to send the second message to the base station, where the second message includes an identifier of the first UE, and the identifier of the first UE is used by the base station to determine that the first UE provides relay for the second UE.

With reference to the fourth aspect or the first possible implementation of the fourth aspect, in a third possible implementation of the fourth aspect, the sending unit is specifically configured to send the second message to the base station, where the second message includes an identifier of the first UE and a first indication, the identifier of the first UE is used by the base station to determine that the first UE provides relay for the second UE, and the first indication is used to instruct the second UE to access a network by using a relay.

With reference to any one of the fourth aspect, or the first to the third possible implementations of the fourth aspect, in a fourth possible implementation of the fourth aspect, the sending unit is specifically configured to: obtain a first identifier, and send a first message to the base station, where the first message includes the first identifier, and the first identifier is in a one-to-one correspondence with the second UE.

With reference to the fourth possible implementation of the fourth aspect, in a fifth possible implementation of the fourth aspect, the first identifier sent by the sending unit is used to indicate that data transmitted in a DRB of the first UE belongs to the second UE, or the first identifier is used to identify the second UE.

According to a fifth aspect, a method for accessing a network by user equipment UE is provided, where the method includes: receiving, by first UE, data that is sent by second UE by using a communications link between the first UE and the second UE; obtaining, by the first UE, a first identifier and a DRB of the first UE that are corresponding to the communications link; and sending, by the first UE, the data to a base station by using the DRB of the first UE, where a packet data unit PDU carrying the data that is sent by using the DRB of the first UE includes the first identifier, and the first identifier is in a one-to-one correspondence with the second UE.

With reference to the fifth aspect, in a first possible implementation of the fifth aspect, that the first identifier is in a one-to-one correspondence with the second UE includes: the first identifier is used to indicate that data transmitted in the DRB belongs to the second UE, or the first identifier is used to identify the second UE.

With reference to the first possible implementation of the fifth aspect, in a second possible implementation of the fifth aspect, the obtaining, by the first UE, a first identifier and a DRB of the first UE that are corresponding to the communications link includes: obtaining, by the first UE by using a stored second correspondence, the first identifier and the DRB of the first UE that are corresponding to the communications link, where the second correspondence includes an identifier of the communications link between the first UE and the second UE, an identifier of the DRB of the first UE, and the first identifier, the identifier of the DRB of the first UE is used to identify the DRB of the first UE, and the identifier of the communications link between the first UE and the second UE is used to identify the communications link between the first UE and the second UE.

With reference to the second possible implementation of the fifth aspect, in a third possible implementation of the fifth aspect, the first UE stores the second correspondence in the following manner: receiving, by the first UE, a message that is sent by the base station and that includes the first identifier, the identifier of the DRB of the first UE, and the identifier of the communications link between the first UE and the second UE, and storing, by the first UE, the second correspondence, where the second correspondence includes the first identifier, the identifier of the DRB of the first UE, and the identifier of the communications link between the first UE and the second UE; or receiving, by the first UE, a message that is sent by the base station and that includes the first identifier and the identifier of the DRB of the first UE, obtaining, by the first UE, the identifier that is of the communications link between the first UE and the second UE and that is corresponding to the identifier of the DRB of the first UE, and storing, by the first UE, the second correspondence, where the second correspondence includes the first identifier, the identifier of the DRB of the first UE, and the identifier of the communications link between the first UE and the second UE.

According to a sixth aspect, first user equipment UE is provided, where the first UE includes: a receiving unit, configured to receive data that is sent by second UE by using a communications link between the first UE and the second UE; a processing unit, configured to obtain a first identifier and a DRB of the first UE that are corresponding to the communications link; and a sending unit, configured to send the data to a base station by using the DRB of the first UE, where a packet data unit PDU carrying the data that is sent by using the DRB of the first UE includes the first identifier, and the first identifier is in a one-to-one correspondence with the second UE.

With reference to the sixth aspect, in a first possible implementation of the sixth aspect, the first identifier sent by the sending unit is used to indicate that data transmitted in the DRB belongs to the second UE, or the first identifier is used to identify the second UE.

With reference to the first possible implementation of the sixth aspect, in a second possible implementation of the sixth aspect, the processing unit is specifically configured to obtain, by using a stored second correspondence, the first identifier and the DRB of the first UE that are corresponding to the communications link, where the second correspondence includes an identifier of the communications link between the first UE and the second UE, an identifier of the DRB of the first UE, and the first identifier, the identifier of the DRB of the first UE is used to identify the DRB of the first UE, and the identifier of the communications link between the first UE and the second UE is used to identify the communications link between the first UE and the second UE.

With reference to the second possible implementation of the sixth aspect, in a third possible implementation of the sixth aspect, the processing unit is specifically configured to store the second correspondence in the following manner: receiving, by the first UE, a message that is sent by the base station and that includes the first identifier, the identifier of the DRB of the first UE, and the identifier of the communications link between the first UE and the second UE, and storing, by the first UE, the second correspondence, where the second correspondence includes the first identifier, the identifier of the DRB of the first UE, and the identifier of the communications link between the first UE and the second UE; or receiving, by the first UE, a message that is sent by the base station and that includes the first identifier and the identifier of the DRB of the first UE, obtaining, by the first UE, the identifier that is of the communications link between the first UE and the second UE and that is corresponding to the identifier of the DRB of the first UE, and storing, by the first UE, the second correspondence, where the second correspondence includes the first identifier, the identifier of the DRB of the first UE, and the identifier of the communications link between the first UE and the second UE.

According to a seventh aspect, a method for accessing a network by user equipment UE is provided, where the method includes: receiving, by first UE, data that is sent by a base station by using a DRB of the first UE, where a packet data unit PDU carrying the data that is sent by using the DRB of the first UE includes a first identifier; and obtaining, by the first UE, a communications link that is between the first UE and the second UE and that is corresponding to the DRB and the first identifier, and sending the data to the second UE by using the communications link, where the first identifier is in a one-to-one correspondence with the second UE.

With reference to the seventh aspect, in a first possible implementation of the seventh aspect, that the first identifier is in a one-to-one correspondence with the second UE includes: the first identifier is used to indicate that data transmitted in the DRB of the first UE belongs to the second UE, or the first identifier is used to identify the second UE.

With reference to the seventh aspect, in a second possible implementation of the seventh aspect, the obtaining, by the first UE, a communications link that is between the first UE and the second UE and that is corresponding to the DRB and the first identifier includes: obtaining, by the first UE by using a stored second correspondence, the communications link that is between the first UE and the second UE and that is corresponding to the DRB and the first identifier, where the second correspondence includes an identifier of the communications link between the first UE and the second UE, an identifier of the DRB of the first UE, and the first identifier, the identifier of the DRB of the first UE is used to identify the DRB of the first UE, and the identifier of the communications link between the first UE and the second UE is used to identify the communications link between the first UE and the second UE.

With reference to the second possible implementation of the seventh aspect, in a third possible implementation of the seventh aspect, the first UE stores the second correspondence in the following manner: receiving, by the first UE, a message that is sent by the base station and that includes the first identifier, the identifier of the DRB of the first UE, and the identifier of the communications link between the first UE and the second UE, and storing, by the first UE, the second correspondence, where the second correspondence includes the first identifier, the identifier of the DRB of the first UE, and the identifier of the communications link between the first UE and the second UE; or receiving, by the first UE, a message that is sent by the base station and that includes the first identifier and the identifier of the DRB of the first UE, obtaining, by the first UE, the identifier that is of the communications link between the first UE and the second UE and that is corresponding to the identifier of the DRB of the first UE, and storing, by the first UE, the second correspondence, where the second correspondence includes the first identifier, the identifier of the DRB of the first UE, and the identifier of the communications link between the first UE and the second UE.

According to an eighth aspect, first user equipment UE is provided, where the first UE includes: a receiving unit, configured to receive data that is sent by a base station by using a DRB of the first UE, where a packet data unit PDU carrying the data that is sent by using the DRB of the first UE includes a first identifier; and a processing unit, configured to: obtain a communications link that is between the first UE and the second UE and that is corresponding to the DRB and the first identifier, and send the data to the second UE by using the communications link, where the first identifier is in a one-to-one correspondence with the second UE.

With reference to the eighth aspect, in a first possible implementation of the eighth aspect, the first identifier sent by the sending unit is used to indicate that data transmitted in the DRB of the first UE belongs to the second UE, or the first identifier is used to identify the second UE.

With reference to the eighth aspect, in a second possible implementation of the eighth aspect, the processing unit is specifically configured to obtain, by using a stored second correspondence, the communications link that is between the first UE and the second UE and that is corresponding to the DRB and the first identifier, where the second correspondence includes an identifier of the communications link between the first UE and the second UE, an identifier of the DRB of the first UE, and the first identifier, the identifier of the DRB of the first UE is used to identify the DRB of the first UE, and the identifier of the communications link between the first UE and the second UE is used to identify the communications link between the first UE and the second UE.

With reference to the second possible implementation of the eighth aspect, in a third possible implementation of the eighth aspect, the processing unit stores the second correspondence in the following manner: receiving a message that is sent by the base station and that includes the first identifier, the identifier of the DRB of the first UE, and the identifier of the communications link between the first UE and the second UE, and storing, by the first UE, the second correspondence, where the second correspondence includes the first identifier, the identifier of the DRB of the first UE, and the identifier of the communications link between the first UE and the second UE; or receiving a message that is sent by the base station and that includes the first identifier and the identifier of the DRB of the first UE, obtaining, by the first UE, the identifier that is of the communications link between the first UE and the second UE and that is corresponding to the identifier of the DRB of the first UE, and storing, by the first UE, the second correspondence, where the second correspondence includes the first identifier, the identifier of the DRB of the first UE, and the identifier of the communications link between the first UE and the second UE.

According to a ninth aspect, a method for accessing a network by user equipment UE is provided, where the method includes: receiving, by a base station, data that is sent by first UE by using a DRB of the first UE, where a packet data unit PDU carrying the data that is sent by using the DRB of the first UE includes a first identifier; obtaining, by the base station, an S1 bearer that is of second UE and that is corresponding to the DRB and the first identifier; and sending, by the base station, the data by using the S1 bearer of the second UE, where the first identifier is in a one-to-one correspondence with the second UE.

With reference to the ninth aspect, in a first possible implementation of the ninth aspect, that the first identifier is in a one-to-one correspondence with the second UE includes: the first identifier is used to indicate that data transmitted in the DRB of the first UE belongs to the second UE, or the first identifier is used to identify the second UE.

With reference to the ninth aspect, in a second possible implementation of the ninth aspect, the obtaining, by the base station, an S1 bearer that is of second UE and that is corresponding to the DRB and the first identifier includes: obtaining, by the base station by using a stored first correspondence, the S1 bearer that is of the second UE and that is corresponding to the DRB and the first identifier, where the first correspondence includes an identifier of the S1 bearer of the second UE, an identifier of the DRB of the first UE, and the first identifier, the identifier of the DRB of the first UE is used to identify the DRB of the first UE, and the identifier of the S1 bearer of the second UE is used to identify the S1 bearer of the second UE.

According to a tenth aspect, a base station is provided, where the base station includes: a receiving unit, configured to receive data that is sent by first UE by using a DRB of the first UE, where a packet data unit PDU carrying the data that is sent by using the DRB of the first UE includes a first identifier; a processing unit, configured to obtain an S1 bearer that is of second UE and that is corresponding to the DRB and the first identifier; and a sending unit, configured to send the data by using the S1 bearer of the second UE, where the first identifier is in a one-to-one correspondence with the second UE.

With reference to the tenth aspect, in a first possible implementation of the tenth aspect, the first identifier received by the receiving unit is used to indicate that data transmitted in the DRB of the first UE belongs to the second UE, or the first identifier is used to identify the second UE.

With reference to the tenth aspect, in a second possible implementation of the tenth aspect, the processing unit is specifically configured to obtain, by using a stored first correspondence, the S1 bearer that is of the second UE and that is corresponding to the DRB and the first identifier, where the first correspondence includes an identifier of the S1 bearer of the second UE, an identifier of the DRB of the first UE, and the first identifier, the identifier of the DRB of the first UE is used to identify the DRB of the first UE, and the identifier of the S1 bearer of the second UE is used to identify the S1 bearer of the second UE.

According to an eleventh aspect, a method for accessing a network by user equipment UE is provided, where the method includes: receiving, by a base station, data that is sent by a second core network entity by using an S1 bearer of second UE; obtaining, by the base station, a DRB of first UE and a first identifier that are corresponding to the S1 bearer; and sending, by the base station, the data by using the DRB of the first UE, where a packet data unit PDU carrying the data that is sent by using the DRB of the first UE includes the first identifier, and the first identifier is in a one-to-one correspondence with the second UE.

With reference to the eleventh aspect, in a first possible implementation of the eleventh aspect, that the first identifier is in a one-to-one correspondence with the second UE includes: the first identifier is used to indicate that data transmitted in the DRB of the first UE belongs to the second UE, or the first identifier is used to identify the second UE.

With reference to the eleventh aspect, in a second possible implementation of the eleventh aspect, the obtaining, by the base station, a DRB of first UE and a first identifier that are corresponding to the S1 bearer includes: obtaining, by the base station by using a stored first correspondence, the DRB of the first UE and the first identifier that are corresponding to the S1 bearer, where the first correspondence includes an identifier of the S1 bearer of the second UE, an identifier of the DRB of the first UE, and the first identifier, the identifier of the DRB of the first UE is used to identify the DRB of the first UE, and the identifier of the S1 bearer of the second UE is used to identify the S1 bearer of the second UE.

According to a twelfth aspect, a base station is provided, where the base station includes: a receiving unit, configured to receive data that is sent by a second core network entity by using an S1 bearer of second UE; a processing unit, configured to obtain a DRB of first UE and a first identifier that are corresponding to the S1 bearer; and a sending unit, configured to send the data by using the DRB of the first UE, where a packet data unit PDU carrying the data that is sent by using the DRB of the first UE includes the first identifier, and the first identifier is in a one-to-one correspondence with the second UE.

With reference to the twelfth aspect, in a first possible implementation of the twelfth aspect, the first identifier obtained by the processing unit is used to indicate that data transmitted in the DRB of the first UE belongs to the second UE, or the first identifier is used to identify the second UE.

With reference to the twelfth aspect, in a second possible implementation of the twelfth aspect, the processing unit is specifically configured to obtain, by using a stored first correspondence, the DRB of the first UE and the first identifier that are corresponding to the S1 bearer, where the first correspondence includes an identifier of the S1 bearer of the second UE, an identifier of the DRB of the first UE, and the first identifier, the identifier of the DRB of the first UE is used to identify the DRB of the first UE, and the identifier of the S1 bearer of the second UE is used to identify the S1 bearer of the second UE.

According to a thirteenth aspect, a method for accessing a network by user equipment UE is provided, where the method includes: receiving, by a base station, a signaling message that is sent by first UE by using a signaling radio bearer SRB, where a packet data unit PDU carrying the signaling message includes a second identifier; determining, by the base station according to the second identifier, that the first UE provides relay for the second UE; and storing, by the base station, information that the first UE provides relay for the second UE, where the second identifier is in a one-to-one correspondence with the second UE.

With reference to the thirteenth aspect, in a first possible implementation of the thirteenth aspect, that the second identifier is in a one-to-one correspondence with the second UE includes: the second identifier is used to indicate that signaling transmitted in the SRB of the first UE belongs to the second UE, or the second identifier is used to identify the second UE.

With reference to the thirteenth aspect, in a second possible implementation of the thirteenth aspect, before the receiving, by a base station, a signaling message that is sent by first UE by using a signaling radio bearer SRB, the method further includes: receiving, by the base station, a signaling message that is sent by the first UE and that is used to request the base station to allocate the second identifier to the second UE; and sending, by the base station, a signaling message including the second identifier to the first UE.

With reference to any one of the thirteenth aspect, or the first to the second possible implementations of the thirteenth aspect, in a third possible implementation of the thirteenth aspect, after the storing, by the base station, information that the first UE provides relay for the second UE, the method further includes: storing, by the base station, a correspondence between the second identifier, the SRB of the first UE, and an S1 application protocol S1-AP of the second UE.

With reference to the third possible implementation of the thirteenth aspect, in a fourth possible implementation of the thirteenth aspect, the method further includes: receiving, by the base station, an RRC message that is sent by the first UE by using the signaling radio bearer SRB of the first UE and that carries a NAS message, where a PDU carrying the RRC message includes the second identifier; obtaining, by the base station, the S1-AP that is of the second UE and that is corresponding to the SRB of the first UE and the second identifier; and sending, by the base station, the NAS message to a first core network entity by using the S1-AP of the second UE.

With reference to the third possible implementation of the thirteenth aspect, in a fifth possible implementation of the thirteenth aspect, the method further includes: receiving, by the base station, an S1-AP message that is sent by a first core network to the second UE by using the S1-AP of the second UE and that carries a NAS message; obtaining, by the base station, the SRB of the first UE and the second identifier that are corresponding to the S1-AP; and sending, by the base station by using the SRB of the first UE, an RRC message including the NAS message to the first UE, where a PDU carrying the RRC message includes the second identifier.

According to a fourteenth aspect, a base station is provided, where the base station includes: a receiving unit, configured to receive a signaling message that is sent by first UE by using a signaling radio bearer SRB, where a packet data unit PDU carrying the signaling message includes a second identifier; a processing unit, configured to determine, according to the second identifier, that the first UE provides relay for the second UE; and a storage unit, configured to store information that the first UE provides relay for the second UE, where the second identifier is in a one-to-one correspondence with the second UE.

With reference to the fourteenth aspect, in a first possible implementation of the fourteenth aspect, the second identifier received by the receiving unit is used to indicate that signaling transmitted in the SRB of the first UE belongs to the second UE, or the second identifier is used to identify the second UE.

With reference to the fourteenth aspect, in a second possible implementation of the fourteenth aspect, the receiving unit is further configured to receive a signaling message that is sent by the first UE and that is used to request the base station to allocate the second identifier to the second UE; and the sending unit is further configured to send a signaling message including the second identifier to the first UE.

With reference to any one of the fourteenth aspect, or the first to the second possible implementations of the fourteenth aspect, in a third possible implementation of the fourteenth aspect, the storage unit is further configured to store a correspondence between the second identifier, the SRB of the first UE, and an S1 application protocol S1-AP of the second UE.

With reference to the second possible implementation of the fourteenth aspect, in a fourth possible implementation of the fourteenth aspect, the receiving unit is further configured to receive an RRC message that is sent by the first UE by using the signaling radio bearer SRB of the first UE and that carries a NAS message, where a PDU carrying the RRC message includes the second identifier; the processing unit is further configured to obtain the S1-AP that is of the second UE and that is corresponding to the SRB of the first UE and the second identifier; and the sending unit is further configured to send the NAS message to a first core network entity by using the S1-AP of the second UE.

With reference to the fourth possible implementation of the fourteenth aspect, in a fifth possible implementation of the fourteenth aspect, the receiving unit is further configured to receive an S1-AP message that is sent by a first core network to the second UE by using the S1-AP of the second UE and that carries a NAS message; the processing unit is further configured to obtain the SRB of the first UE and the second identifier that are corresponding to the S1-AP; and the sending unit is further configured to send, by using the SRB of the first UE, an RRC message including the NAS message to the first UE, where a PDU carrying the RRC message includes the second identifier.

According to a fifteenth aspect, a method for accessing a network by user equipment UE is provided, where the method includes: determining, by first UE, a second identifier; and sending, by the first UE by using a radio bearer SRB, a signaling message including the second identifier to a base station, where the second identifier is in a one-to-one correspondence with the second UE.

With reference to the fifteenth aspect, in a first possible implementation of the fifteenth aspect, that the second identifier is in a one-to-one correspondence with the second UE includes: the second identifier is used to indicate that a signaling message transmitted in the SRB of the first UE belongs to the second UE, or the second identifier is used to identify the second UE.

With reference to the fifteenth aspect, in a second possible implementation of the fifteenth aspect, before the determining, by first UE, a second identifier, the method further includes: sending, by the first UE to the base station, a signaling message that is used to request the base station to allocate the second identifier to the second UE; and receiving, by the first UE, a signaling message that is sent by the base station and that includes the second identifier.

With reference to any one of the fifteenth aspect, or the first to the second possible implementations of the fifteenth aspect, in a third possible implementation of the fifteenth aspect, the method further includes: storing, by the first UE, a correspondence between the second identifier and an identifier of the second UE.

With reference to the third possible implementation of the fifteenth aspect, in a fourth possible implementation of the fifteenth aspect, after the storing, by the first UE, a correspondence between the second identifier and an identifier of the second UE, the method further includes: receiving, by the first UE, a signaling message sent by the second UE, obtaining, by the first UE, the second identifier corresponding to the identifier of the second UE, and sending, by the first UE, the signaling message of the second UE by using the SRB of the first UE, where a packet data unit PDU carrying the signaling message includes the second identifier; or receiving, by the first UE, a signaling message that is sent by the base station by using the SRB of the first UE, where a PDU carrying the signaling message includes the second identifier, obtaining, by the first UE, the identifier that is of the second UE and that is corresponding to the second identifier, and sending the signaling message of the second UE to the second UE.

With reference to any one of the fifteenth aspect, or the first to the fourth possible implementations of the fifteenth aspect, in a fifth possible implementation of the fifteenth aspect, the signaling message includes one of the following messages: an RRC message, a PDCP message, an RLC message, or a MAC message.

According to a sixteenth aspect, first user equipment UE is provided, where the first UE includes: a processing unit, configured to determine a second identifier; and a sending unit, configured to send, by using a radio bearer SRB, a signaling message including the second identifier to a base station, where the second identifier is in a one-to-one correspondence with the second UE.

With reference to the sixteenth aspect, in a first possible implementation of the sixteenth aspect, the second identifier determined by the processing unit is used to indicate that a signaling message transmitted in the SRB of the first UE belongs to the second UE, or the second identifier is used to identify the second UE.

With reference to the sixteenth aspect, in a second possible implementation of the sixteenth aspect, the sending unit is further configured to send, to the base station, a signaling message that is used to request the base station to allocate the second identifier to the second UE; and the first UE further includes: a receiving unit, configured to receive a signaling message that is sent by the base station and that includes the second identifier.

With reference to any one of the sixteenth aspect, or the first to the second possible implementations of the sixteenth aspect, in a third possible implementation of the sixteenth aspect, the first UE further includes: a storage unit, configured to store a correspondence between the second identifier and an identifier of the second UE.

With reference to the third possible implementation of the sixteenth aspect, in a fourth possible implementation of the sixteenth aspect, the processing unit is specifically configured to: receive a signaling message sent by the second UE, obtain the second identifier corresponding to the identifier of the second UE, and send the signaling message of the second UE by using the SRB of the first UE, where a packet data unit PDU carrying the signaling message includes the second identifier; or receive a signaling message that is sent by the base station by using the SRB of the first UE, where a PDU carrying the signaling message includes the second identifier, obtain, by the first UE, the identifier that is of the second UE and that is corresponding to the second identifier, and send the signaling message of the second UE to the second UE.

With reference to any one of the sixteenth aspect, or the first to the fourth possible implementations of the sixteenth aspect, in a fifth possible implementation of the sixteenth aspect, the signaling message sent by the sending unit includes one of the following messages: an RRC message, a PDCP message, an RLC message, or a MAC message.

According to a seventeenth aspect, a method for accessing a network by user equipment UE is provided, where the method includes: receiving, by first UE, a signaling message of second UE; sending, by the first UE, the signaling message to a base station by using a radio bearer SRB; and receiving, by the first UE, a signaling message that is sent by the base station and that includes a second identifier, where when the first UE transmits signaling for the second UE by using the SRB, the second identifier is used to indicate that a signaling message transmitted in the SRB of the first UE belongs to the second UE.

With reference to the seventeenth aspect, in a first possible implementation of the seventeenth aspect, the method further includes: storing, by the first UE, a correspondence between the second identifier, the SRB of the first UE, and an identifier of the second UE.

With reference to the first possible implementation of the seventeenth aspect, in a second possible implementation of the seventeenth aspect, after the storing, by the first UE, a correspondence between the second identifier, the SRB of the first UE, and an identifier of the second UE, the method further includes: receiving, by the first UE, an RRC message sent by the second UE, obtaining, by the first UE, the second identifier corresponding to the first UE, and sending the RRC message of the second UE by using the SRB of the first UE, where the RRC message includes the second identifier; or receiving, by the first UE, an RRC message that is sent by the base station by using the SRB of the first UE, where the RRC message includes the second identifier, obtaining, by the first UE, the identifier that is of the second UE and that is corresponding to the second identifier, and sending the RRC message to the second UE.

According to an eighteenth aspect, first user equipment UE is provided, where the first UE includes: a processing unit, configured to receive a signaling message of second UE; and a sending unit, configured to send the signaling message to a base station by using a radio bearer SRB, where the processing unit is further configured to receive a signaling message that is sent by the base station and that includes a second identifier, where when the first UE transmits signaling for the second UE by using the SRB, the second identifier is used to indicate that a signaling message transmitted in the SRB of the first UE belongs to the second UE.

With reference to the eighteenth aspect, in a first possible implementation of the eighteenth aspect, the first UE further includes: a storage unit, configured to store a correspondence between the second identifier, the SRB of the first UE, and an identifier of the second UE.

With reference to the first possible implementation of the eighteenth aspect, in a second possible implementation of the eighteenth aspect, the processing unit is further configured to: receive an RRC message sent by the second UE, obtain the second identifier corresponding to the first UE, and send the RRC message of the second UE by using the SRB of the first UE, where the RRC message includes the second identifier; or receive an RRC message that is sent by the base station by using the SRB of the first UE, where the RRC message includes the second identifier, obtain, by the first UE, the identifier that is of the second UE and that is corresponding to the second identifier, and send the RRC message to the second UE.

According to a nineteenth aspect, a base station is further provided, and the base station mainly includes a processor, an interface, and a memory. The processor may be configured to complete a corresponding function of the processing unit, the determining unit, the configuration unit, or the like. The interface may be configured to complete corresponding functions of the receiving unit, the sending unit, and the like. The memory may be configured to complete corresponding functions of the storage unit and the like.

According to a twentieth aspect, user equipment is further provided, and the user equipment mainly includes a processor, an interface, and a memory. The processor may be configured to complete a corresponding function of the processing unit, the determining unit, the configuration unit, or the like. The interface may be configured to complete corresponding functions of the receiving unit, the sending unit, and the like. The memory may be configured to complete corresponding functions of the storage unit and the like.

According to the technical solutions described above, on a base station side, the base station determines that the first UE provides relay for the second UE, and the base station sends the first message including the first identifier to the first UE, so that the DRB of the first UE is used to transmit data of the second UE. On a terminal side, the first UE provides relay for the second UE, and the first UE receives the first message including the first identifier. The first identifier is included in the first message, and the first identifier is in a one-to-one correspondence with the second UE, so that the second UE can access a network by using the first UE, and transmit data by using the DRB of the first UE. The first UE does not need to allocate a special DRB to the second UE, so that energy consumption of the second UE is reduced, and a quantity of second UEs that can be borne by the first UE is increased.

BRIEF DESCRIPTION OF THE DRAWINGS

FIG. 1c-i and FIG. 1C-2 are flowcharts 1 of a method for accessing a network by UE according to Embodiment 3 of the present invention;

FIG. 2 is a flowchart 2 of a method for accessing a network by UE according to Embodiment 3 of the present invention;

FIG. 9A and FIG. 9B are flowcharts of a method for accessing a network by UE according to Embodiment 8 of the present invention;

DETAILED DESCRIPTION OF ILLUSTRATIVE EMBODIMENTS

To resolve a problem that due to a performance limitation of UE, the UE usually can bear a relatively small quantity of wearable devices, in the technical solutions provided in the present invention, after a wearable device accesses a network by using UE, the wearable device uses a DRB of the UE, and a specified identifier is used to determine whether data is sent by the wearable device or the UE. Therefore, one UE can bear a plurality of wearable devices.

A first identifier provided in embodiments of the present invention may be an identifier of second UE, or the first identifier may be an identifier that is in a unique correspondence with the identifier of the second UE. For example, 0010 represents the second UE. The first identifier may be one or more of the following identifiers: a Packet Data Convergence Protocol identifier (PDCP ID), a Radio Link Control identifier (RLC ID), or a Media Access Control identifier (MAC ID).

Figure 1A:
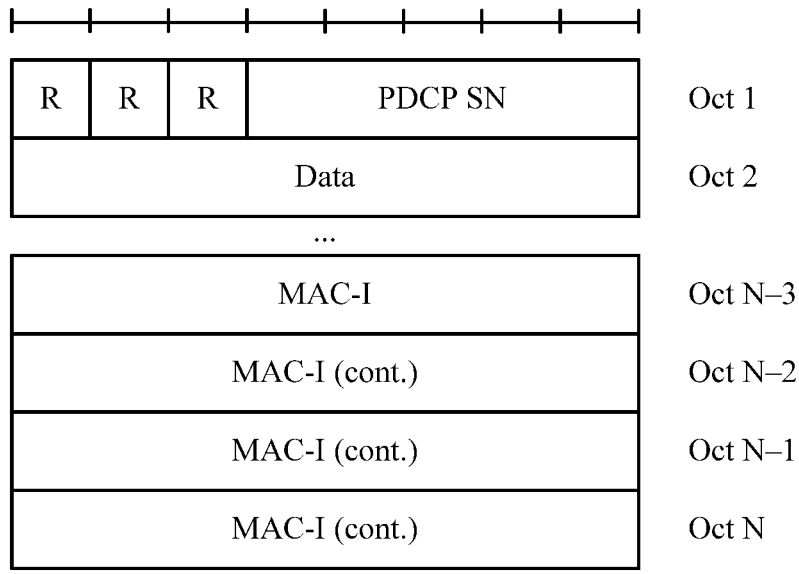
FIG. 1a is a schematic diagram of a first identifier according to the present invention.

For example, when the first identifier is the PDCP ID, the PDCP ID may be included in a reserved field of a PDCP packet data unit (PDU), for example, an R region shown in FIG. 1a; or the PDCP ID may be carried in a new field. The PDCP ID may be the identifier of the second UE, or the PDCP ID may be an identifier that is in a correspondence with the identifier of the second UE.

When the first identifier is the RLC ID, the RLC ID may be carried in a new field of an RLC PDU. The RLC ID may be the identifier of the second UE, or the RLC ID may be an identifier that is in a correspondence with the identifier of the second UE.

When the first identifier is the MAC ID, the MAC ID may be carried in a new field of a MAC PDU. The MAC ID may be the identifier of the second UE, or the MAC ID may be an identifier that is in a correspondence with the identifier of the second UE.

A second identifier provided in the embodiments of the present invention may be one or more of the following identifiers: a PDCP ID, an RLC ID, or a MAC ID. The second identifier may be an identifier of the second UE, or the second identifier may be an identifier that is in a correspondence with the identifier of the second UE.

For example, when the second identifier is the PDCP ID, the PDCP ID may be included in a reserved field of a PDCP packet data unit (PDU), or the PDCP ID may be carried in a new field. The PDCP ID may be the identifier of the second UE, or the PDCP ID may be an identifier that is in a correspondence with the identifier of the second UE.

When the second identifier is the RLC ID, the RLC ID may be carried in a new field of an RLC PDU. The RLC ID may be the identifier of the second UE, or the RLC ID may be an identifier that is in a correspondence with the identifier of the second UE.

When the second identifier is the MAC ID, the MAC ID may be carried in a new field of a MAC PDU. The MAC ID may be the identifier of the second UE, or the MAC ID may be an identifier that is in a correspondence with the identifier of the second UE.

In the technical solutions provided in the embodiments of the present invention, a signaling message includes one of the following messages: an RRC message, a PDCP message, an RLC message, a MAC message, or the like.

Main implementation principles and specific implementations of the technical solutions in the embodiments of the present invention, and corresponding beneficial effects that can be achieved thereby are described below in detail with reference to the accompanying drawings.

For ease of description, in the technical solutions provided in the embodiments of the present invention, first UE and second UE are used as examples for detailed description. The second UE may be a device such as a wearable device or a sensor, or may be a chip or module that has a wearable function or sensing function. The first UE may be a device such as a smartphone or an iPad, or may be a chip or module that has a mobile communication function.

Embodiment 1

Figure 1B:
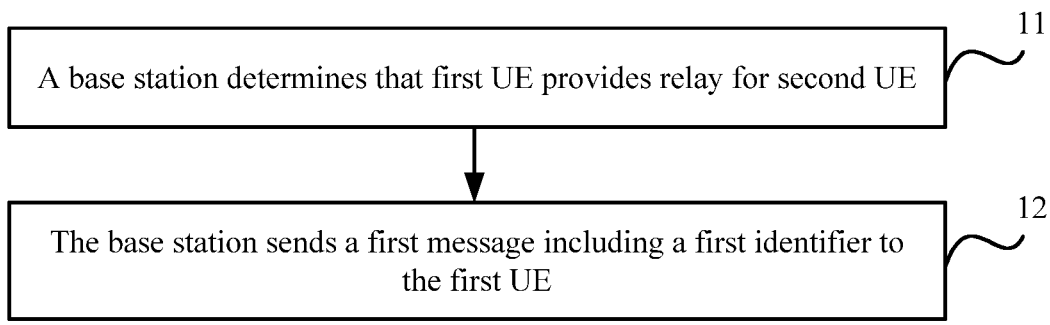
FIG. 1b is a flowchart of a method for accessing a network by UE according to Embodiment 1 of the present invention.

Embodiment 1 of the present invention provides a method for accessing a network by UE. As shown in FIG. 1b, a specific processing procedure of the method is as follows.

Step 11: A base station determines that first UE provides relay for second UE.

The base station determines, in one of the following manners, that the first UE provides relay for the second UE.

In a first manner, the base station receives a second message that is sent by a first core network entity and that is used to manage a bearer of the second UE. The second message includes an identifier of the first UE. The base station determines, according to the identifier of the first UE, that the first UE provides relay for the second UE.

In a second manner, the base station receives a second message that is sent by a first core network entity and that is used to manage a bearer of the second UE.

The second message includes an identifier of the first UE and a first indication. The base station determines, according to the identifier of the first UE and the first indication, that the first UE provides relay for the second UE. The first indication is used to instruct the second UE to access a network by using a relay.

In a third manner, the base station stores information that the first UE provides relay for the second UE, and the base station determines, according to the information, that the first UE provides relay for the second UE.

Optionally, after step 11, the method may further include: storing, by the base station, the information that the first UE provides relay for the second UE.

The base station receives a signaling message that is sent by using an SRB of the first UE, and the base station determines, according to a second identifier, that the first UE provides relay for the second UE, and stores the information that the first UE provides relay for the second UE. A PDU carrying the signaling message includes the second identifier, and the second identifier is used to indicate that a signaling message transmitted in the SRB of the first UE belongs to the second UE.

Before the base station receives the signaling message that is sent by the second UE by using the SRB of the first UE, the method further includes: receiving, by the base station, a message that is sent by the first UE and that is used by the first UE to request the base station to allocate the second identifier to the second UE; allocating, by the base station, the second identifier to the second UE; and sending, by the base station, a message including the second identifier to the first UE.

Step 12: The base station sends a first message including a first identifier to the first UE.

The first message is used to manage a data radio bearer DRB of the first UE, so that the DRB of the first UE is used to transmit data of the second UE. Managing the DRB of the first UE may include but is not limited to: creating a DRB of the first UE, or modifying or restoring a DRB of the first UE.

The restoring a DRB of the first UE is restoring, on the first UE, a DRB that has been set up, so that the DRB of the UE is used to transmit data of the second UE. The creating a DRB of the first UE is creating a DRB on the first UE. After the base station receives a request that is sent by the first core network entity and that is used to create a bearer or modify a bearer on the second UE, if the base station determines that no DRB meeting a QoS requirement of the bearer exists in the first UE, the base station initiates a DRB create request to the first UE, so that the DRB of the first UE is used to transmit data of the second UE. The modifying a DRB of the first UE is modifying an existing DRB of the first UE. After the base station receives a request that is sent by the first core network entity and that is used to create a bearer or modify a bearer on the second UE, if the base station determines that a DRB meeting a QoS requirement of the bearer exists in the first UE, the base station initiates a DRB modify request to the first UE, so that the DRB of the first UE is used to transmit data of the second UE.

Optionally, before the base station sends the first message including the first identifier to the first UE, the method may further include: receiving, by the base station, a second message that is sent by a first core network entity and that is used to manage a bearer of the second UE, and obtaining, by the base station according to the second message, QoS of a DRB that needs to be used by the second UE; and when the base station determines that a DRB meeting the QoS requirement exists in the first UE, determining, by the base station, to modify the DRB meeting the QoS requirement in the first UE, so that the DRB of the first UE is used to transmit data of the second UE; or when the base station determines that no DRB meeting the QoS requirement exists in the first UE, setting up, by the base station on the first UE, a DRB meeting the QoS requirement.

Managing the bearer of the second UE may include but is not limited to: restoring a bearer of the second UE, creating a bearer of the second UE, or modifying a bearer of the second UE. For example, the restoring a bearer of the first UE is restoring an S1 bearer of the first UE and a DRB corresponding to the S1 bearer. This may be implemented by using an S1-AP initial context setup request message. The message may include a context of one or more bearers of the first UE, and the base station restores the one or more bearers of the first UE according to the context of the bearer of the second UE. The creating a bearer of the second UE is creating, on the second UE, an S1 bearer and a DRB corresponding to the S1 bearer. This may be implemented by using a bearer setup request message. The message may include a context of one or more bearers that need to be set up on the second UE, and the base station sets up the one or more bearers on the second UE according to the context of the bearer that needs to be set up on the second UE. The modifying a bearer of the second UE is modifying an existing S1 bearer of the second UE and a DRB corresponding to the S1 bearer. This may be implemented by using a bearer modify request message. The message may include a context of one or more bearers that need to be modified on the second UE, and the base station modifies the one or more bearers on the second UE according to the context of the bearer that needs to be modified on the second UE.

A method for obtaining, by the base station according to the second message, the QoS of the DRB that needs to be used by the second UE includes: The second message carries QoS of a bearer, and the base station obtains, according to the QoS of the bearer, QoS of a DRB corresponding to the bearer. A 4G communications system is used as an example. One EPS bearer of UE is divided into three parts. A first part is a bearer between the UE and a base station, that is, a DRB. A second part is a bearer between the base station and a serving gateway (SGW), that is, an S1 bearer. A third part is a bearer between the SGW and a packet data network (PDN) gateway, that is, an S5/S8 bearer. The S1 bearer and the S5/S8 bearer of the EPS bearer belong to a core network part, and have same QoS. The QoS is referred to as QoS of a core network. The DRB belongs to an air interface part. QoS of the DRB is in a one-to-one correspondence with the QoS of the core network, but a specific value of the QoS of the DRB is different from that of the QoS of the core network. In this solution, the second UE needs to use the DRB of the first UE to transmit data, and therefore the second UE has no DRB. Herein, the DRB that needs to be used by the second UE is specifically QoS that is of a DRB and that is corresponding to QoS of a core network.

A method for determining, by the base station, whether a DRB meeting the QoS requirement exists in the first UE includes: determining, by the base station, whether QoS of one or more existing DRBs of the first UE meets a requirement of the QoS that is of the DRB and that is corresponding to the QoS of the bearer; and if yes, determining, by the base station, that a DRB meeting the QoS requirement exists in the first UE; otherwise, determining that no DRB meeting the QoS requirement exists in the first UE. The 4G communications system is used as an example. The QoS that is of the DRB and that is corresponding to the QoS of the bearer is QoS that is of the DRB and that is corresponding to the QoS of the core network. The second message carries the QoS of the core network, and the base station obtains the QoS of the core network from the second message.

Optionally, before step 12, the method may further include: allocating, by the base station, the first identifier to the second UE; or receiving, by the base station, a third message that is sent by a first core network entity and that includes the first identifier, and obtaining, by the base station, the first identifier from the third message.

In the foregoing step, the base station may allocate the first identifier to the second UE, or the base station may receive the first identifier that is allocated by the first core network entity to the second UE.

Optionally, after step 12 in which the base station sends the first message including the first identifier to the first UE, the method further includes: receiving, by the base station, data that is sent by using the DRB of the first UE, obtaining, by the base station, an S1 bearer that is of the second UE and that is corresponding to the DRB and the first identifier, and sending, by the base station, the data to a second core network entity by using the S1 bearer; or receiving, by the base station, data that is sent by the second core network entity to the second UE by using an S1 bearer of the second UE, obtaining, by the base station, the first identifier and the DRB of the first UE that are corresponding to the S1 bearer, and sending, by the base station, the data by using the DRB of the first UE.

A PDU carrying the data that is sent by using the DRB of the first UE includes the first identifier.

The base station obtains, by using a first correspondence in a context of the first UE, the first identifier and the DRB of the first UE that are corresponding to the S1 bearer.

The first correspondence includes an identifier of the DRB of the first UE, the first identifier, and an identifier of the S1 bearer of the second UE. The identifier of the DRB of the first UE is used to identify the DRB of the first UE, and the identifier of the S1 bearer of the second UE is used to identify the S1 bearer of the second UE. Specifically, the identifier of the DRB of the first UE may be an RB-ID of the first UE, or the identifier of the DRB of the first UE may include the identifier of the first UE and the RB-ID of the first UE. The identifier of the S1 bearer of the second UE may be an S1 tunnel endpoint identifier (TEID). In specific implementation, the S1 TEID of the second UE may be an S1 TEID of the second UE, or the S1 TEID of the second UE may include an identifier of the second UE and the S1 TEID of the second UE. Details are not described again in subsequent embodiments of the present invention.

The base station may obtain, from a stored first correspondence, the S1 bearer that is of the second UE and that is corresponding to the DRB and the first identifier.

The first correspondence includes an identifier of the DRB of the first UE, the first identifier, and an identifier of the S1 bearer of the second UE. The identifier of the DRB of the first UE is used to identify the DRB of the first UE, and the identifier of the S1 bearer of the second UE is used to identify the S1 bearer of the second UE. The identifier of the S1 bearer of the second UE may be an identifier of the S1 bearer of the second UE, or may be an identifier of the second UE and the identifier of the S1 bearer of the second UE. The first correspondence may be stored in a context of the first UE, and/or the first correspondence may be stored in a context of the second UE.

Optionally, before step 12, the method may further include: sending, by the base station, the first message including the first identifier to the first UE, where the first message further includes an identifier that is used to identify a communications link between the first UE and the second UE, so that the first UE stores a second correspondence.

The second correspondence includes an identifier of the DRB of the first UE, the first identifier, and the identifier that is used to identify the communications link between the first UE and the second UE.

Embodiment 2

The specific processing process that is of the method for accessing a network by UE and that is on a base station side is described in detail in Embodiment 1. At least one core network entity may be further included on a network side. The core network entity may be disposed in a network as an independent component device, or may be used as a module integrated into another network element device in a network. Herein, a processing process of a network element device other than the base station in the method for accessing a network by UE is described in detail by using an example in which a first core network entity and a second core network entity are two independent network element devices.

Step 1: A first core network entity receives a message that is sent by first UE and that is used to request to enter a connected state from an idle state.

The first core network entity receives the message that is sent by the first UE and that is used to request to enter the connected state from the idle state, the first core network entity obtains an identifier of second UE, and the first core network entity obtains context information of a bearer of the second UE according to the identifier of the second UE.

The message that is used to request to enter the connected state from the idle state includes the identifier of the second UE. The message that is used to request to enter the connected state from the idle state may be a service request message or an extended service request message.

Step 2: The first core network entity sends a second message to a base station when the first core network entity determines that the first UE provides relay for second UE.

The second message is used to manage the bearer of the second UE, and the second message includes the context information of the bearer of the second UE. The second message may further include an identifier of the first UE, and the identifier of the first UE is used by the base station to determine that the first UE provides relay for the second UE.

The second message may further include an identifier of the first UE and a first indication, the identifier of the first UE is used by the base station to determine that the first UE provides relay for the second UE, and the first indication is used to instruct the second UE to access a network by using a relay.

The first core network entity obtains a first identifier, and the first core network entity sends a first message to the base station. The first message includes the first identifier, and the first identifier is in a one-to-one correspondence with the second UE.

Embodiment 3

Figures 1, 1C:
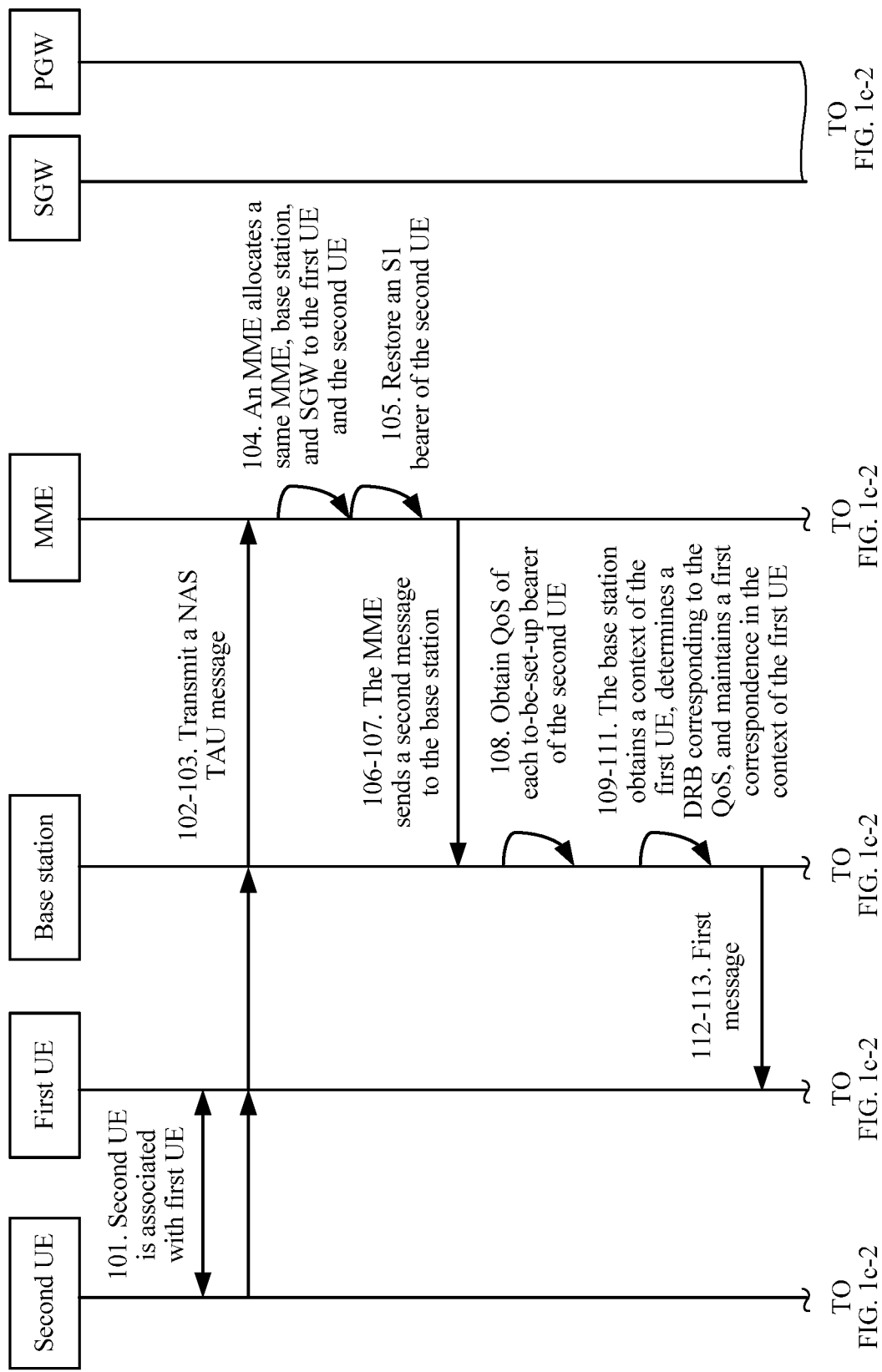
Figure 2:
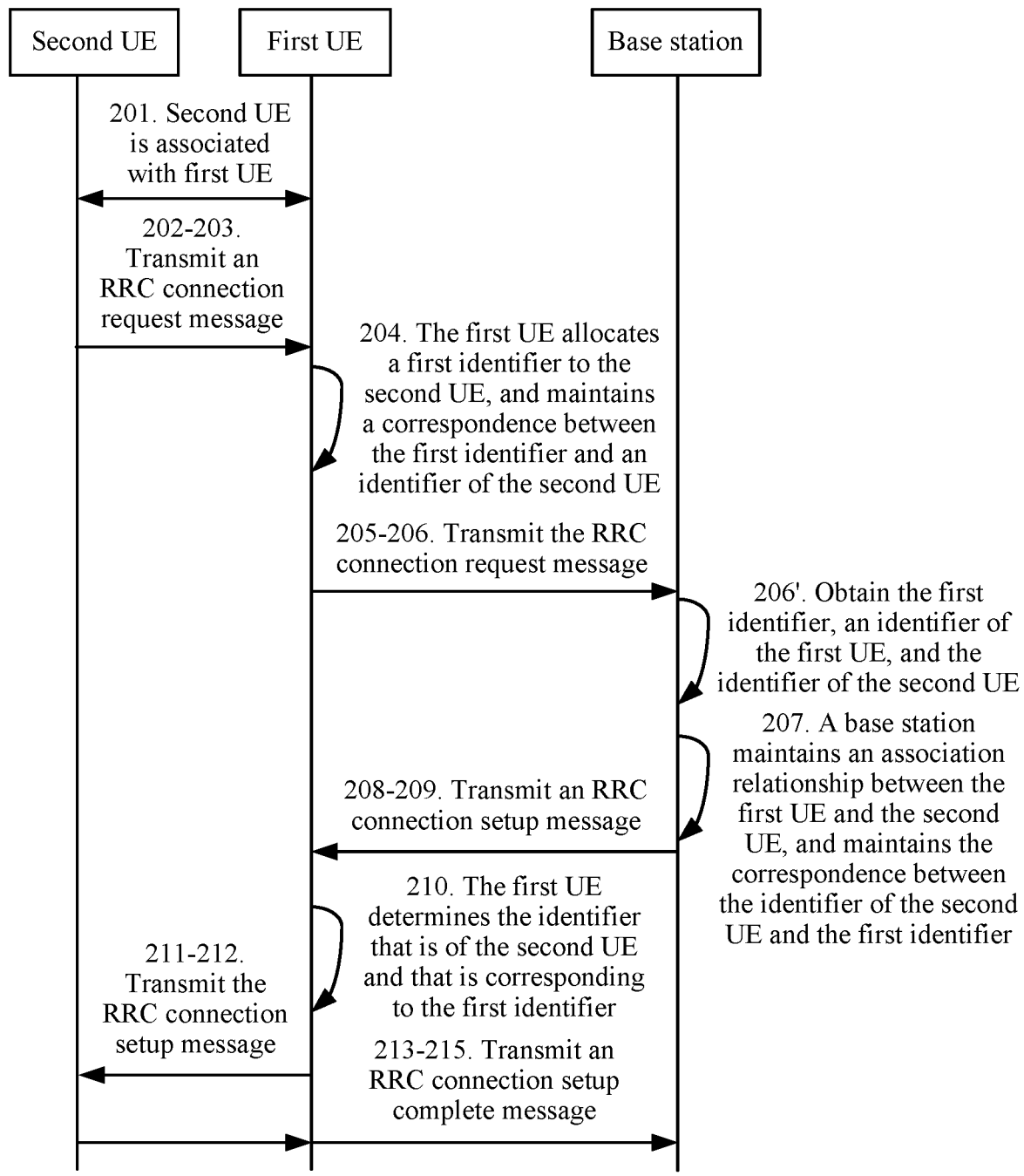

Embodiment 3 of the present invention provides a method for accessing a network by UE. In the technical solutions provided in Embodiment 3 of the present invention, an example in which a first core network entity is an MME and a second core network entity is an SGW is used for detailed description. As shown in FIG. 1c-1 and FIG. 1c-2, a specific processing procedure of the method is as follows.

101. Second UE is associated with first UE and sets up a connection to the first UE.

That the second UE is associated with the first UE specifically means that an association relationship or a matching relationship is set up between the first UE and the second UE. Therefore, the second UE can access a network by using the first UE, or send data to a network by using the first UE. Details are not described again in subsequent embodiments of the present invention.

The second UE is associated with the first UE by using an interface between the second UE and the first UE, and the second UE accesses a network by using the first UE. An example in which the interface between the second UE and the first UE is a PC5 interface is used for detailed description in the following.

102. The second UE sends a non-access stratum (NAS) tracking area update (TAU) message to a mobility management entity (MME) by using the first UE.

In step 102, the second UE may send, in the following two implementations, the NAS TAU message to the MME by using the first UE.

In a first implementation, when an RRC connection is set up between the second UE and a base station, the second UE may send, by using the first UE, an RRC message including a WD NAS message to the base station, and the base station sends the RRC message including the WD NAS message to the MME.

In the first manner, specific processing manners of setting up the RRC connection between the second UE and the base station may include the following manners.

A. As shown in FIG. 2, a specific processing process of setting up the RRC connection between the second UE and the base station is as follows:

201. The first UE is associated with the second UE.

The first UE may be associated with the second UE in a device-to-device (D2D) manner in an LTE communications system, or in a Bluetooth or infrared manner, or the like. The second UE may perform signaling-plane or user-plane data transmission with the associated first UE.

202. The second UE sends an RRC connection request message to the first UE.

In step 202, the second UE obtains an interface between the second UE and the associated first UE, determines an interface message by using the obtained interface, and sends the RRC connection request message by using the interface message. In an implementation, the second UE sends the RRC connection request message to the first UE by using a PC5 interface message.

That the second UE sends the RRC connection request message to the first UE may be as follows: The second UE generates the RRC connection request message, and sends the RRC connection request to the first UE. Optionally, the PC5 interface message further includes RRC indication information. The RRC indication information is used to notify the first UE that the PC5 interface message received by the first UE includes an RRC message.

Alternatively, that the second UE sends the RRC connection request message to the first UE may be specifically as follows: The second UE generates a PDCP PDU including the RRC connection request, and sends the PDCP PDU to the first UE. Optionally, the PC5 interface message further includes indication information of the PDCP PDU. The indication information is used to notify the first UE that the PC5 interface message received by the first UE includes the PDCP PDU.

Alternatively, that the second UE sends the RRC connection request message to the first UE may be specifically as follows: The second UE generates an RLC PDU including the RRC connection request, and sends the RLC PDU to the first UE. Optionally, the PC5 interface message further includes indication information of the RLC PDU. The indication information is used to notify the first UE that the PC5 interface message received by the first UE includes the RLC PDU.

203. The first UE receives the RRC connection request message sent by the second UE.

The first UE obtains the RRC connection request of the second UE from the PC5 interface message. The first UE directly obtains the RRC connection request of the second UE from the PC5 interface message. Optionally, the first UE learns, according to the indication information, that the PC5 interface includes the RRC message. Alternatively, the first UE directly obtains the PDCP PDU of the second UE from the PC5 interface message, and the first UE obtains the RRC connection requires of the second UE from the PDCP PDU of the second UE.

Optionally, the first UE learns, according to the indication information, that the PC5 interface includes the PDCP PDU. Alternatively, the first UE directly obtains the RLC PDU of the second UE from the PC5 interface message, and the first UE obtains the RRC connection request of the second UE from the RLC PDU of the second UE.

Optionally, the first UE learns, according to the indication information, that the PC5 interface includes the RLC PDU.

204. The first UE allocates a first identifier to the second UE, and the first UE stores a correspondence between the first identifier and an identifier of the second UE.

In step 204, the first UE obtains the identifier of the second UE. The identifier of the second UE may be obtained in step 201, or may be obtained from the received RRC connection request message.

205. The first UE sends the RRC connection request message to a base station, where the RRC connection request message includes the first identifier.

206. The base station receives the RRC connection request message that is sent by the first UE and that includes the first identifier.

206'. The base station obtains the first identifier, an identifier of the first UE, and the identifier of the second UE from the received RRC connection request message.

In steps 205 to 206', the RRC connection request message between the first UE and the base station is transmitted by using a signaling radio bearer (SRB). For example, the RRC connection request message between the first UE and the base station is transmitted by using an SRB1.

The base station determines, according to the first identifier in the RRC connection request message, that the RRC connection request message is sent by the second UE that is associated with the first UE. The base station obtains the identifier of the first UE, the identifier of the second UE, and the first identifier from the RRC connection request message.

207. The base station stores an association relationship between the first UE and the second UE, and stores the correspondence between the identifier of the second UE and the first identifier.

208. The base station sends an RRC connection setup message to the first UE.

In step 208, the base station sends the RRC connection setup message to the first UE. The RRC connection setup message includes the first identifier corresponding to the identifier of the second UE.

209. The first UE receives the RRC connection setup message sent by the base station.

210. The first UE determines, according to the first identifier in the RRC connection setup message, the identifier that is of the second UE and that is corresponding to the first identifier.

211. The first UE sends, by using a PC5 interface, the RRC connection setup message to the second UE corresponding to the identifier of the second UE.

212. The second UE receives the RRC connection setup message sent by the first UE.

213. The second UE sends an RRC connection setup complete message to the first UE.

214. The first UE receives the RRC connection setup complete message sent by the second UE.

215. The first UE sends the RRC connection setup complete message to the base station, where the RRC connection setup complete message includes the first identifier.

In the manner A, when the RRC connection is being set up, the first UE allocates the first identifier to the second UE, and the first UE stores the correspondence between the first identifier and a second identifier, so that the first UE can determine, by using the first identifier, data sent by the second UE.

Figure 3A:
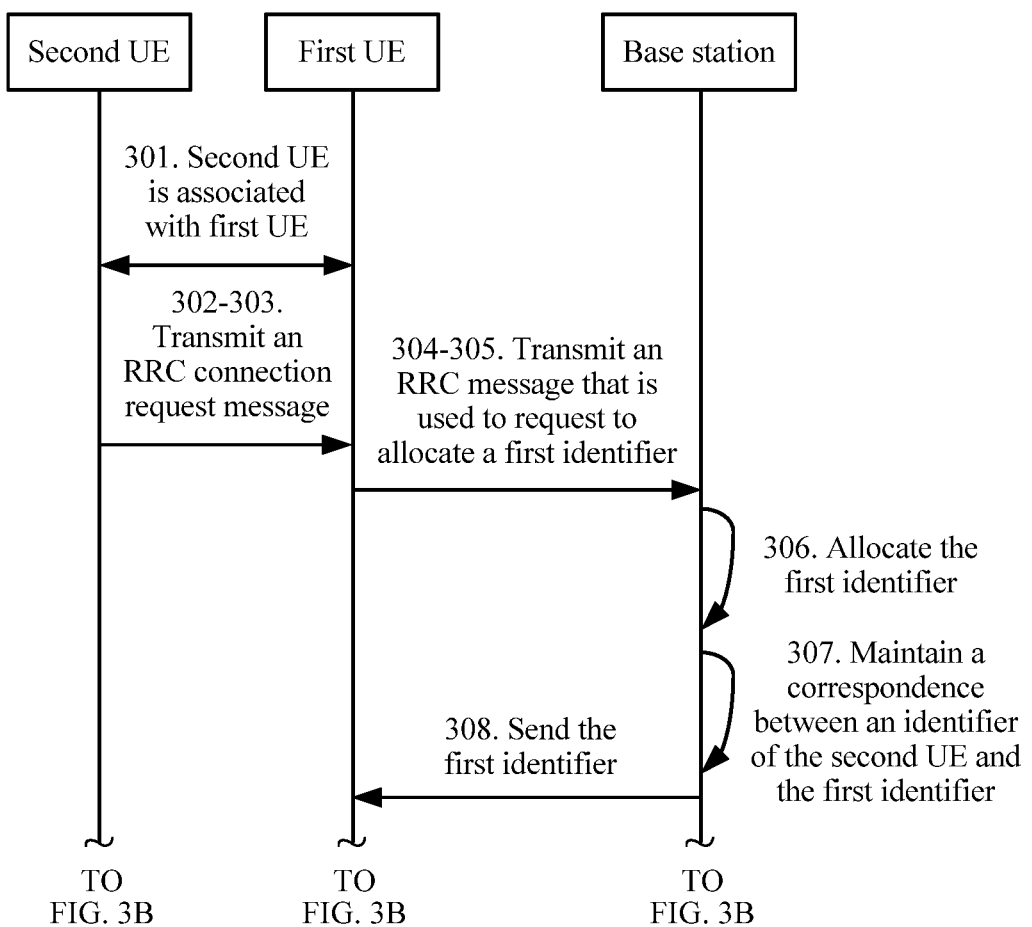
FIG. 3A and FIG. 3B are flowcharts 3 of a method for accessing a network by UE according to Embodiment 3 of the present invention.
Figure 3B:
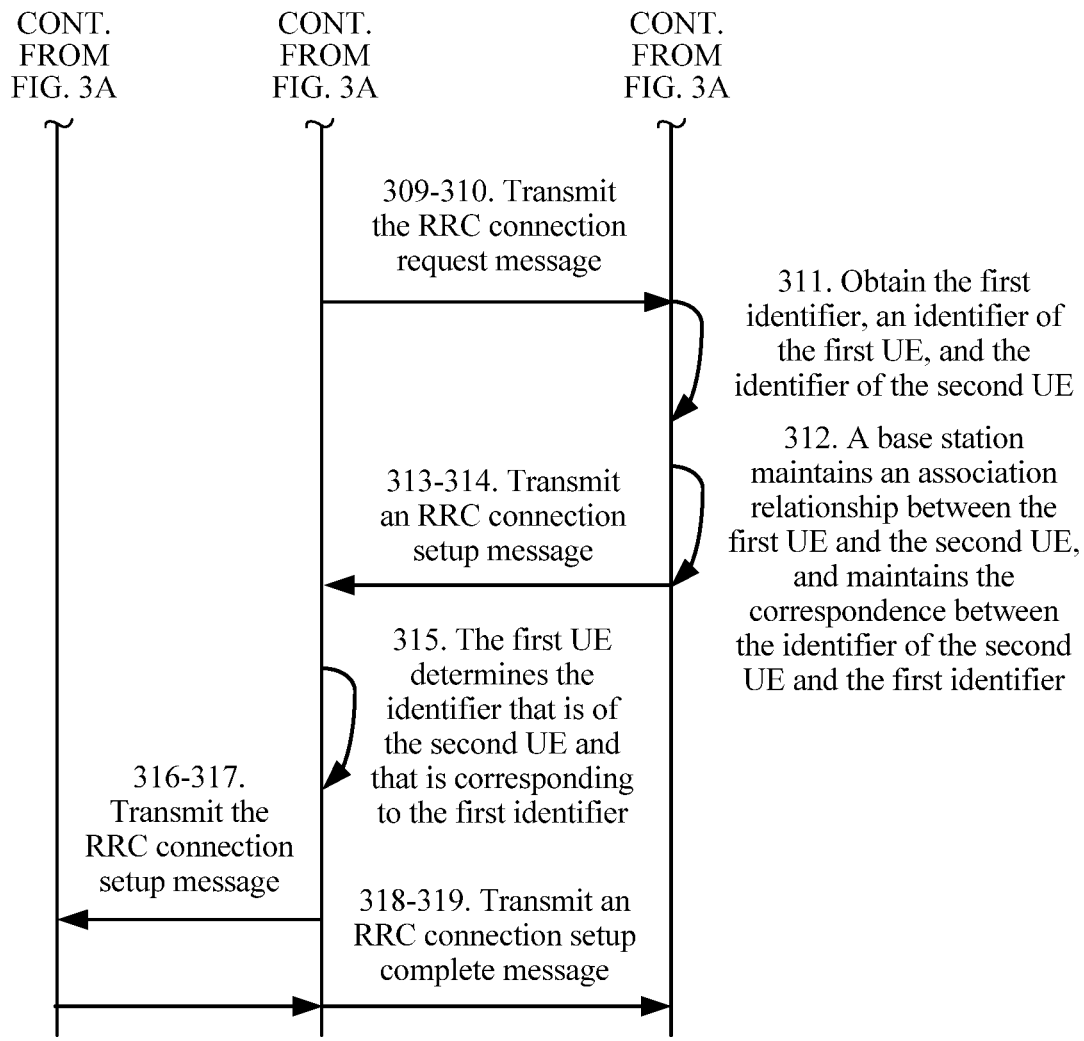

B. As shown in FIG. 3A and FIG. 3B, a specific processing process of setting up the RRC connection between the second UE and the base station is as follows:

For steps 301 to 303, refer to the detailed descriptions of steps 201 to 203. Details are not described again.

304. The first UE sends an RRC message to a base station, where the RRC message is used to request the base station to allocate a first identifier to the second UE.

In step 304, the first UE may send a UL information transfer message to the base station. The UL information transfer message includes an identifier of the second UE.

Optionally, the UL information transfer message may further include indication information that is used to apply to the base station for allocation of the first identifier.

305. The base station receives the RRC message sent by the first UE.

306. The base station obtains an identifier of the second UE, and allocates the corresponding first identifier to the second UE.

307. The base station stores a correspondence between the identifier of the second UE and the first identifier.

308. The base station sends the first identifier to the first UE by using an RRC message.

For example, the base station may send the allocated first identifier to the first UE by using a DL information transfer message.

Optionally, the DL information transfer message may further include the identifier of the second UE.

For steps 309 to 319, refer to the detailed descriptions of steps 205 to 215. Details are not described again.

In the manner B, in a process of setting up the RRC connection, the first UE requests the base station to allocate the first identifier to the second UE, the base station stores an association relationship between the first UE and the second UE and the correspondence between the first identifier and the identifier of the second UE, and the first UE stores the correspondence between the second UE and the first identifier, so that the first UE can determine, by using the first identifier, data sent by the second UE.

Figure 4:
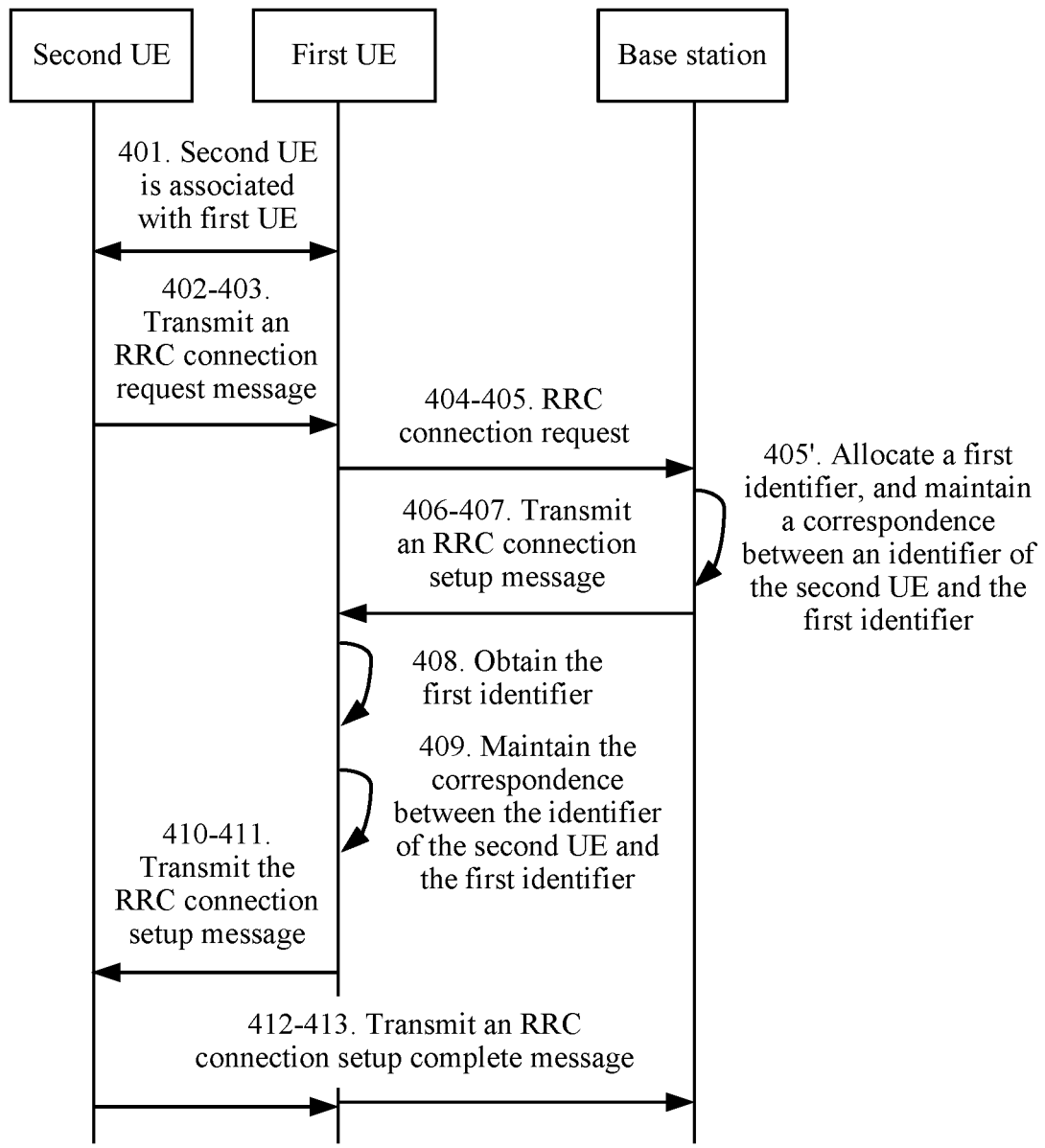
FIG. 4 is a flowchart 4 of a method for accessing a network by UE according to Embodiment 3 of the present invention.

C. As shown in FIG. 4, a specific processing procedure of setting up the RRC connection between the second UE and the base station is as follows.

For steps 401 to 403, refer to the detailed descriptions of steps 201 to 203. Details are not described again.

404. The first UE sends the RRC connection request message to a base station, where a layer corresponding to a first identifier is not encrypted.

If the first identifier is a PDCP ID, a PDCP layer is not encrypted.

405. The base station receives the RRC connection request message, determines that the layer corresponding to the first identifier is not encrypted, and determines that the RRC connection request message is sent by the second UE that is associated with the first UE.

405'. The base station obtains an identifier of the second UE from the RRC connection request message, and allocates the corresponding first identifier to the second UE; the base station stores a correspondence between the identifier of the second UE and the first identifier; and the base station stores an association relationship between the first UE and the second UE.

406. The base station sends an RRC connection setup message including the first identifier to the first UE.

407. The first UE receives the RRC connection setup message including the first identifier.

408. The first UE obtains the first identifier from the RRC connection setup message.

409. The first UE stores the correspondence between the identifier of the second UE and the first identifier.

For steps 410 to 413, refer to the detailed descriptions of steps 211 to 215. Details are not described again.

In the manner B, in a process of setting up the RRC connection, the base station determines, by itself, to allocate the first identifier to the second UE, the base station stores the association relationship between the first UE and the second UE and the correspondence between the first identifier and the identifier of the second UE, and the first UE stores the correspondence between the second UE and the first identifier, so that the first UE can determine, by using the first identifier, data sent by the second UE.

In step 102, a second implementation in which the second UE sends the NAS TAU message to the MME by using the first UE is as follows:

When a logical NAS connection is set up between the second UE and the MME, the second UE sends a NAS message to the first UE. The first UE encapsulates, into a specific NAS message of the first UE, the received NAS message sent by the second UE, and sends the NAS message to the MME. The MME obtains the NAS message of the WD from the NAS message of the first UE.

103. The MME receives the NAS TAU message sent by the first UE.

104. The MME allocates a same MME, base station, and SGW to the first UE and the second UE.

In step 104, if the MME detects that an MME corresponding to the second UE is not the current MME, the MME performs, according to an AU procedure, an operation of setting up the association relationship between the second UE and the first UE.

105. The MME initiates, according to a bearer context of the second UE, a process of restoring an S1 bearer of the second UE.

Optionally, the MME allocates, to an EPS bearer or EPS bearers of the second UE, a corresponding identifier of a communications link between the first UE and the second UE. The identifier of the communications link may be specifically a D2D bearer identity DBI or a slide link identity SLI.

106. The MME sends a second message to the base station.

In step 106, the second message is used by the second UE to request to use a DRB of the first UE to transmit data.

For example, the first message may be an S1-AP initial context setup request, and the request is used to restore the S1 bearer for the second UE.

The second message such as the S1-AP initial context setup request may include the following parameters: the identifier of the second UE and an E-RAB to Be Setup List. Each E-RAB to Be Setup in the E-RAB to Be Setup List includes the following parameters: an EBI and QoS. Optionally, each E-RAB to Be Setup in the E-RAB to Be Setup List may further include the identifier of the communications link between the first UE and the second UE.

Specifically, if the NAS connection is set up between the second UE and the MME, the second message further includes the identifier of the first UE.

107. The base station receives the second message.

108. When determining, according to the second message, that the first UE is a relay of the second UE, the base station obtains QoS of each to-be-set-up bearer of the second UE.

The base station may determine, in the following manners, whether the first UE is a relay of the second UE, that is, whether the second UE accesses a network by using the first UE after the second UE is associated with the first UE.

If the RRC connection is set up between the second UE and the base station, the base station may learn, according to the association relationship that is between the first UE and the second UE and that is stored by the base station, that the second UE is a relay of the first UE.

If the NAS connection is set up between the second UE and the MME, the MME adds the identifier of the first UE to a message sent to the UE, and the base station may learn, according to the identifier of the first UE, that the first UE performs relay for the second UE.

109. The base station obtains a context of the second UE.

110. The base station determines, in the context of the second UE, a DRB corresponding to the QoS.

111. The base station stores a first correspondence in the context of the second UE.

The first correspondence includes a radio bearer RB identifier of the first UE, a first identifier, and an S1 TEID of the second UE.

In steps 108 to 111, if the base station determines that the first UE is a relay of the second UE, the base station searches a context of the first UE according to QoS of each bearer in the E-RAB to Be Setup List of the second UE, to determine whether a DRB corresponding to the QoS exists. If a DRB corresponding to the QoS exists, the base station allocates the corresponding first identifier to the second UE in a context of the corresponding DRB of the first UE. The base station records the following correspondence in the context of the first UE and in the context of the second UE: a correspondence between the RB-ID of the second UE, the first identifier, and the S1 TEID of the second UE.

If no DRB corresponding to the QoS is found in the context of the first UE, the base station sets up, on the first UE, a DRB meeting the QoS, and allocates the corresponding first identifier to the second UE in a context of the DRB of the first UE; and the base station records the following correspondence in the context of the first UE and in the context of the second UE: a correspondence between the RB-ID of the first UE, the first identifier, and the S1 TEID of the second UE. Specifically, the RB-ID of the first UE may be an RB-ID of the first UE, or the RB-ID of the first UE may include the identifier of the first UE and the RB-ID of the first UE. The S1 TEID of the second UE may be an S1 TEID of the second UE, or the S1 TEID of the second UE may include the identifier of the second UE and the S1 TEID of the second UE.

112. The base station sends a first message to the first UE.

The first message is used to instruct the first UE to use the DRB of the first UE to transmit data of the second UE. The first message includes the first identifier and the identifier of the second UE.

For example, the first message is an RRC connection reconfiguration message. The base station sends the RRC connection reconfiguration message to the first UE, and adds the following fields to each DRB-ToAddMod in a DRB-To Add Mod List in radio Resource Config Dedicated of the message: the first identifier and the identifier of the second UE.

Optionally, the first message may further carry the identifier of the communications link between the first UE and the second UE. The identifier of the communications link may be specifically a D2D bearer identity DBI or a slide link identity SLI. An example in which the identifier of the communications link between the first UE and the second UE is the DBI is used for description in the following. In this case, a D2D bearer is specifically the communications link between the first UE and the second UE.

When the first UE needs to set up a DRB for the second UE, the base station may set an EBI to a special value, for example, EBI=0, to notify the first UE that the DRB is set up for the second UE.

113. The first UE receives the first message.

114. The first UE determines specific second UE for which each DRB is used to transmit data.

115. The first UE stores a correspondence between a DBI of the second UE, an RB-ID, and a first identifier.

The correspondence that is between the DBI of the second UE, the RB-ID, and the first identifier and that is stored by the first UE is as follows: Data of a D2D bearer indicated by the DBI of the second UE needs to be sent to a DRB indicated by the RB-ID. In addition, setting is performed according to the first identifier, so that after receiving data of the DRB indicated by the RB-ID, the base station may forward, according to the first identifier, the data to the S1 bearer corresponding to the second UE.

The first UE learns of, according to the stored correspondence between the first identifier and the identifier of the second UE, a specific WD for which each DRB is used to transmit data.

Optionally, if the MME does not allocate a DBI, when the first UE receives the second message, the first UE allocates a DBI to the second UE, and notifies the second UE of QoS of a D2D bearer corresponding to the DBI, and the second UE performs mapping between an EPS bearer and the D2D bearer according to QoS-based mapping.

116. The first UE returns an RRC connection reconfiguration complete message to the base station.

117. The base station receives the RRC connection reconfiguration complete message.

118. The base station returns an S1-AP initial context setup complete message to the MME.

119. The MME sends a modify bearer request message to the SGW.

120. The SGW receives the modify bearer request message.

121. The SGW sends a modify bearer response message to the MME.

122. The MME receives the modify bearer response message.

In steps 119 to 122, the modify bearer messages are exchanged between the MME and the SGW, so that a corresponding bearer is set up between the base station and the SGW.

123. The MME sends a NAS TAU accept message to the second UE by using the first UE.

124. Set up, between the second UE and the first UE, a D2D bearer meeting a QoS requirement.

In the technical solutions provided in Embodiment 1, when the second UE has independently accessed a network and further finds that the first UE that can be used as a relay exists around the second UE, the second UE is associated with the first UE, so as to access a network and set up a bearer, In this process, signaling and data are exchanged between the first UE, the second UE, the base station, the MME, and the SGW, so that the corresponding first identifier is allocated to the second UE. The first identifier can uniquely identify data sent by the second UE. The first UE may store a plurality of correspondences between the first identifier and the identifier of the second UE, so that the first UE can be used as a relay of a plurality of second UEs, and provides a network access service for the second UEs.

Embodiment 4

Figure 5A:
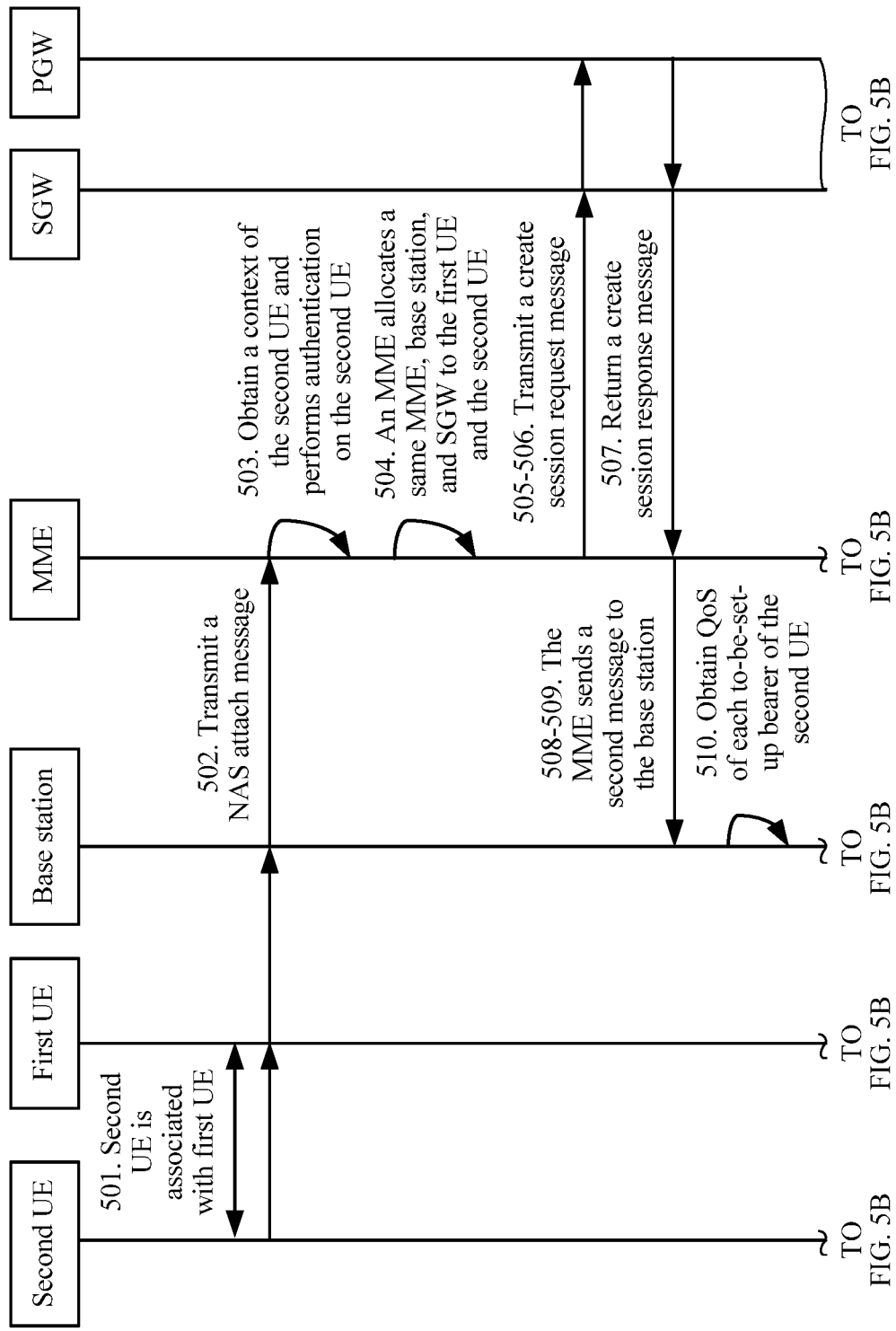
FIG. 5A and FIG. 5B are flowcharts of a method for accessing a network by UE according to Embodiment 4 of the present invention.
Figure 5B:
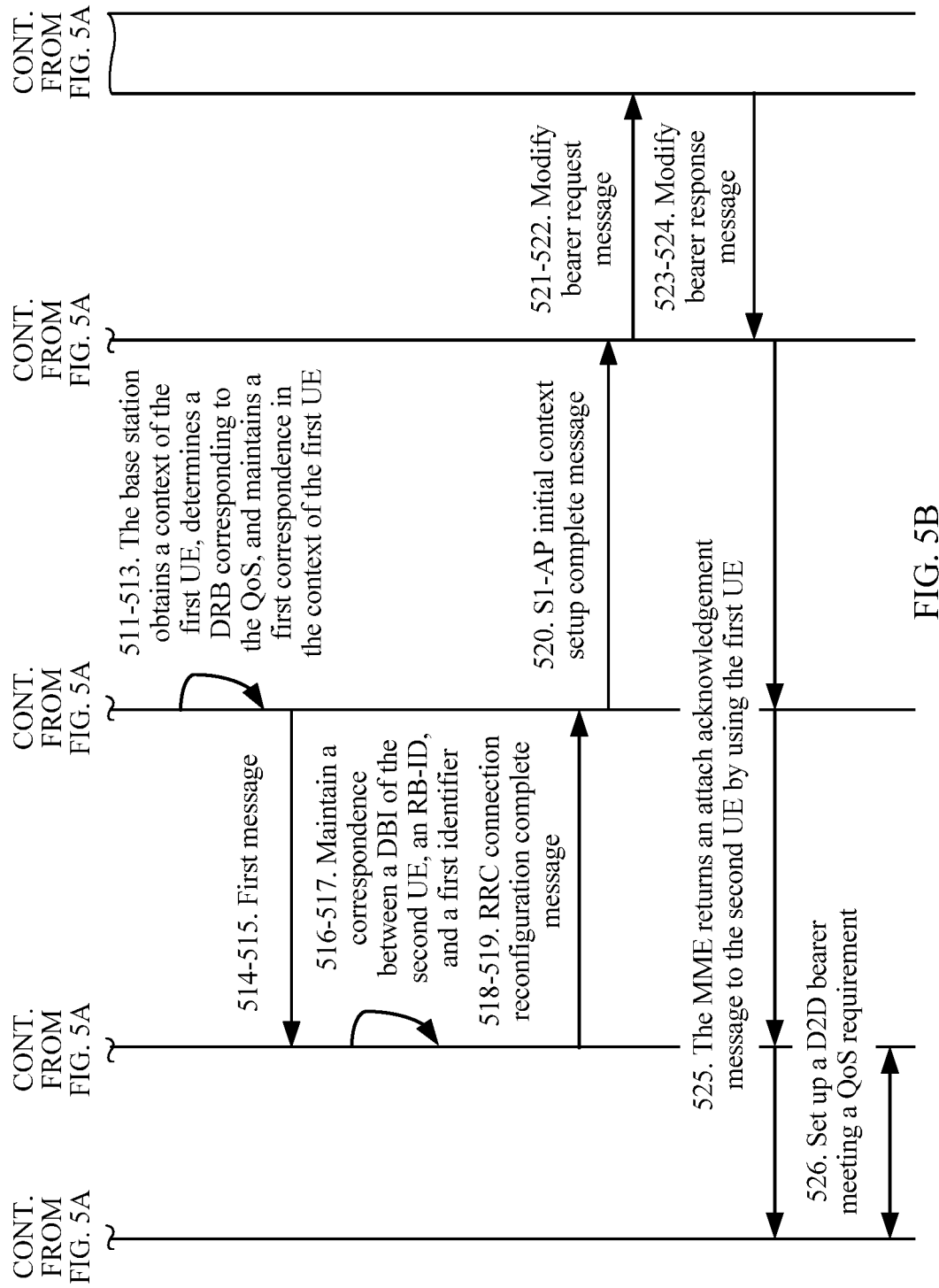

Embodiment 4 of the present invention provides a method for accessing a network by UE. As shown in FIG. 5A and FIG. 5B, a specific processing procedure of the method is as follows.

501. Second UE is associated with first UE and sets up a connection to the first UE.

The second UE is associated with the first UE by using an interface between the second UE and the first UE, and the second UE accesses a network by using the first UE.

502. The second UE sends a NAS attach message to an MME by using the first UE.

For a specific implementation of step 502, refer to the detailed descriptions of step 102 in Embodiment 1. Details are not described herein again.

503. The MME obtains a context of the second UE and performs authentication on the second UE.

According to the received NAS attach message sent by the second UE, the MME obtains the context of the second UE, and performs authentication on the second UE.

504. The MME allocates a same MME, base station, and SGW to the first UE and the second UE.

Optionally, the MME allocates a DBI to a D2D path between the first UE and the second UE.

505. The MME sends a create session request message to a PGW by using the SGW.

506. The PGW receives the create session request message.

507. The PGW returns a create session response message.

For steps 508 to 524, refer to the detailed descriptions of steps 106 to 122. Details are not described herein again.

525. The MME returns an attach acknowledgement message to the second UE by using the first UE.

526. The second UE sets up, with the first UE, a communications link between the first UE and the second UE according to QoS. For example, the communications link is a D2D bearer or a PC5 bearer.

In the technical solutions provided in Embodiment 2, the second UE has independently accessed a network but exits the accessed network because of the second UE is powered off or switched off; and when the second UE is started, the second UE determines that the first UE with which the second UE can be associated exists around, and by using the first UE, the second UE accesses a network and sets up a bearer. In this process, signaling and data are exchanged between the first UE, the second UE, the base station, the MME, and the SGW, so that a corresponding first identifier is allocated to the second UE. The first identifier can uniquely identify data sent by the second UE. The first UE may store a plurality of correspondences between the first identifier and an identifier of the second UE, so that the first UE can be used as a relay of a plurality of second UEs, and provides a network access service for the second UEs.

Embodiment 5

Figure 6:
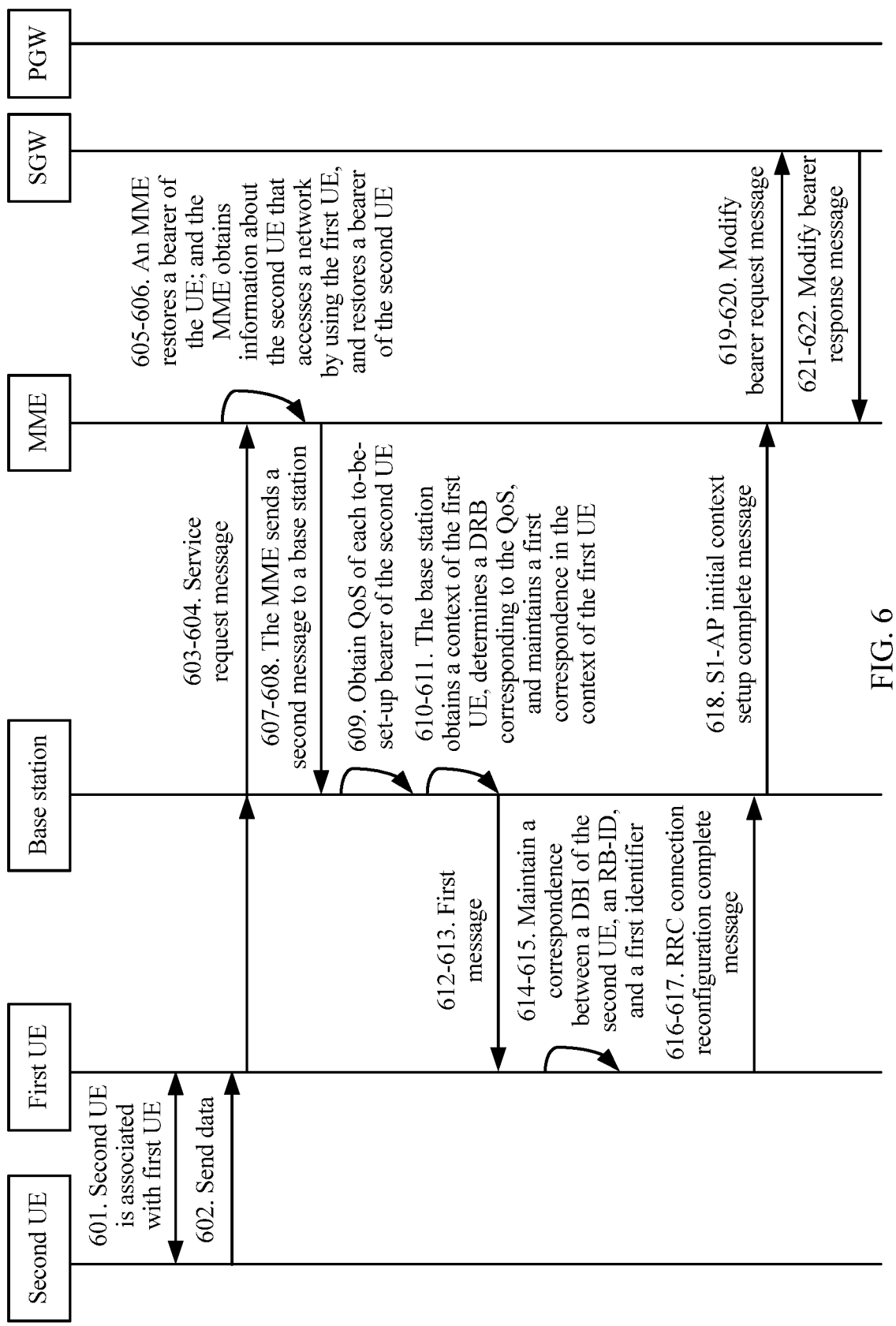
FIG. 6 is a flowchart of a method for accessing a network by UE according to Embodiment 5 of the present invention.

Embodiment 5 of the present invention provides a method for accessing a network by UE. As shown in FIG. 6, a specific processing procedure of the method is as follows.

601. Second UE is associated with first UE and sets up a connection to the first UE.

The second UE is associated with the first UE by using an interface between the second UE and the first UE, and the second UE accesses a network by using the first UE.

602. The second UE sends data to the first UE.

603. When the first UE is in an idle state, the first UE sends a service request message to an MME.

604. The MME receives the service request message sent by the first UE.

605. The MME restores a bearer of the UE.

606. The MME obtains information about the second UE that accesses a network by using the first UE, and restores a bearer of the second UE.

For steps 607 to 622, refer to the detailed descriptions of steps 106 to 122. Details are not described herein again.

In the technical solutions provided in Embodiment 3, the first UE is associated with the second UE, and the first UE is used as a relay of the second UE. When the second UE needs to transmit data, if the first UE is in an idle state, the first UE receives data sent by the second UE and sends the service request message to the MME. In this case, when the first UE is switched from the idle state to a connected state, the MME restores, to a connected state, all second UEs associated with the first UE.

Embodiment 6

Figure 7A:
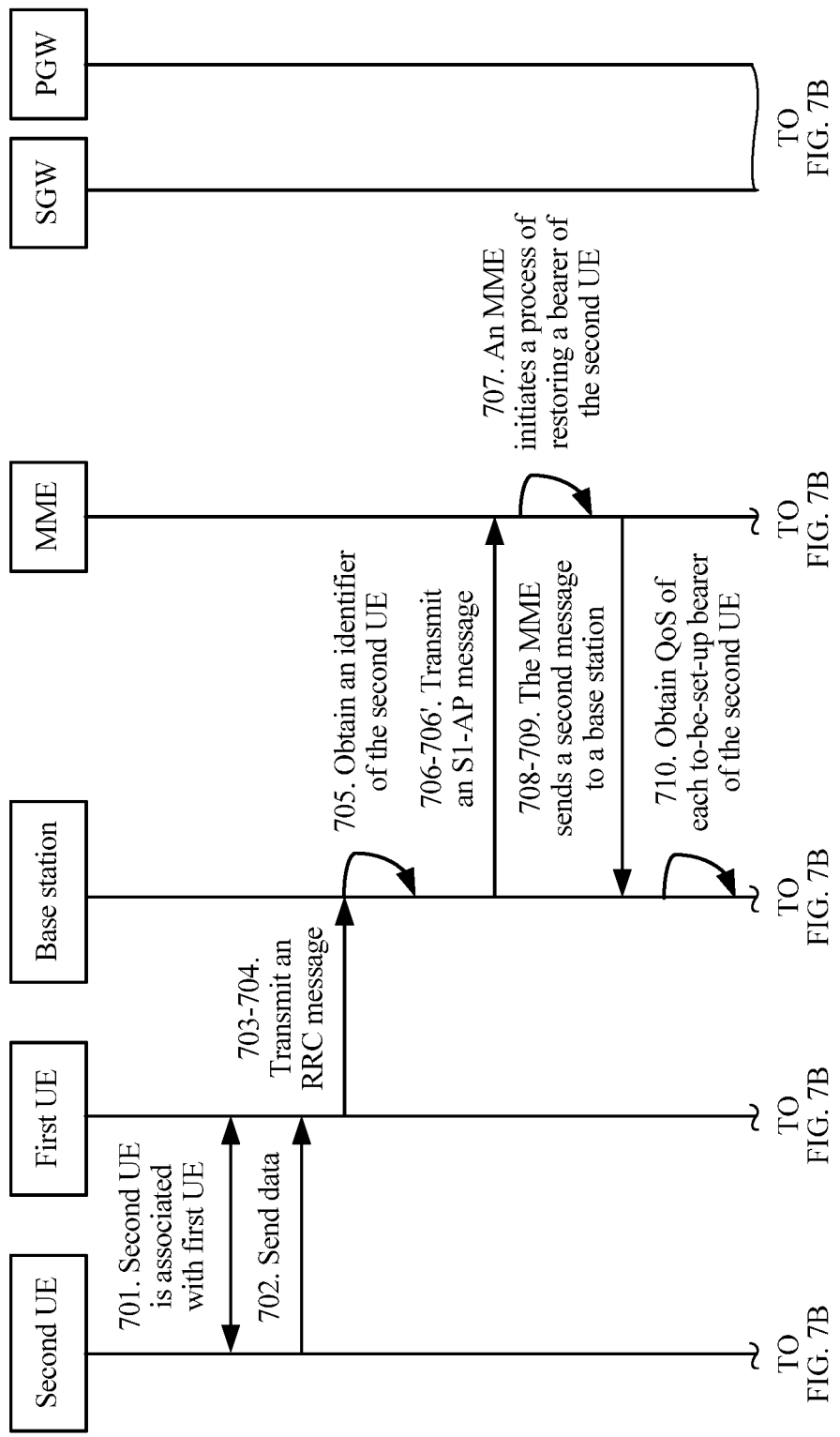
FIG. 7A and FIG. 7B are flowcharts of a method for accessing a network by UE according to Embodiment 6 of the present invention.
Figure 7B:
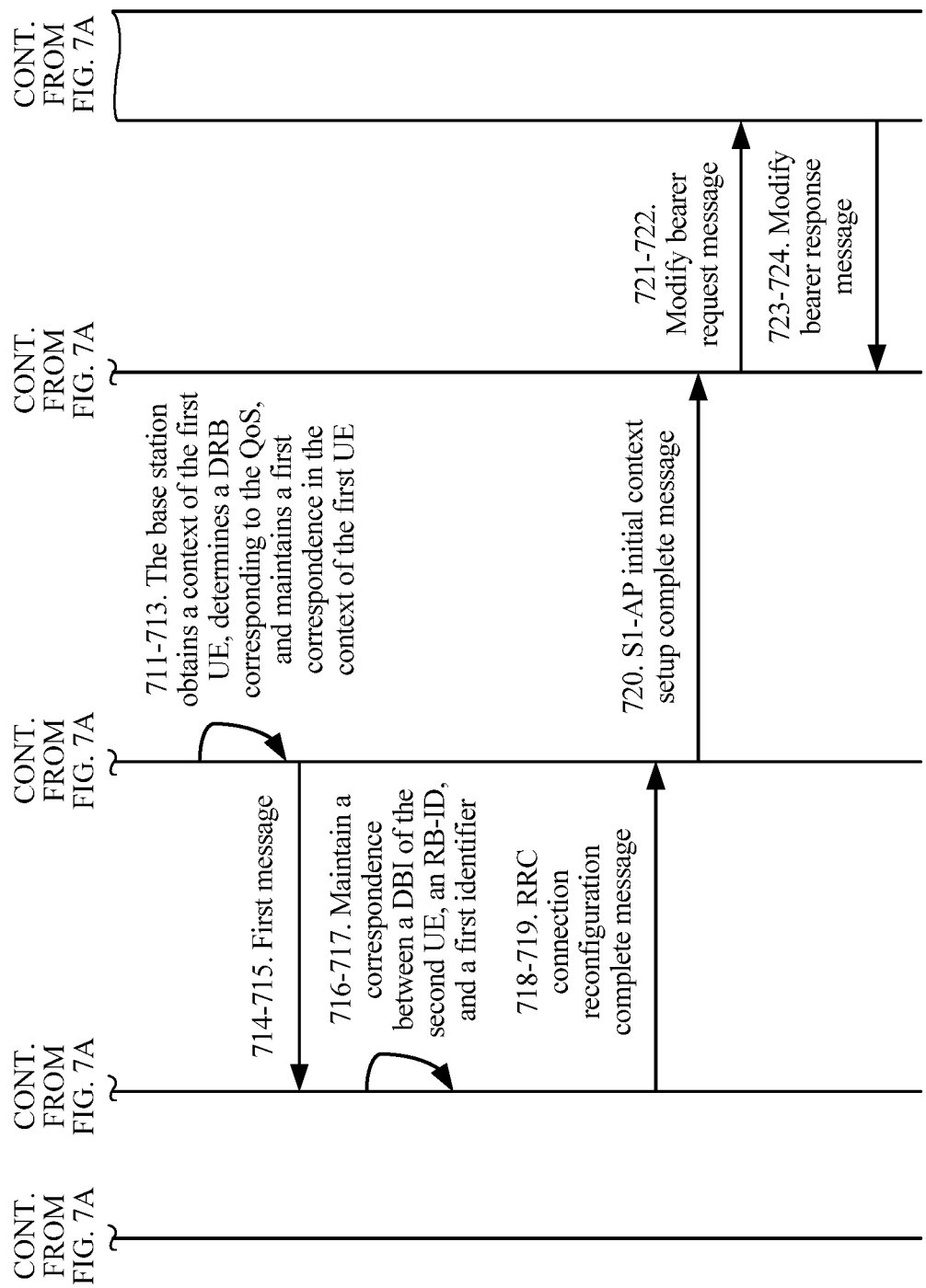

Embodiment 6 of the present invention provides a method for accessing a network by UE. As shown in FIG. 7A and FIG. 7B, a specific processing procedure of the method is as follows.

701. Second UE is associated with first UE and sets up a connection to the first UE.

The second UE is associated with the first UE by using an interface between the second UE and the first UE, and the second UE accesses a network by using the first UE.

702. The second UE sends data to the first UE.

703. The first UE sends an RRC message to a base station.

The RRC message carries a NAS service request message. The RRC message further includes an identifier of the second UE. For example, the identifier of the second UE may be an S-TMSI.

704. The base station receives the RRC message sent by the first UE.

705. The base station obtains an identifier of the second UE from the received RRC message.

706. The base station sends an S1-AP message including the identifier of the second UE to an MME.

706'. The MME receives the S1-AP message that is sent by the base station and that includes the identifier of the second UE.

707. The MME learns, according to the identifier of the second UE, that the 1-AP message is used to restore a bearer of the second UE, and then the MME initiates a process of restoring the bearer of the second UE.

For steps 708 to 724, refer to the detailed descriptions of steps 106 to 122. Details are not described herein again.

In the technical solutions provided in Embodiment 4 of the present invention, when the first UE enters a connected state from an idle state. Only a bearer of the first UE is restored. If the second UE needs to send data, the second UE sends the data to the first UE. The first UE determines whether a first identifier corresponding to a DBI of the second UE exists. If a first identifier corresponding to the DBI of the second UE exists, the first UE directly sends the received data. If no first identifier corresponding to the DBI of the second UE exists, the first UE sends, again to the MME, a service request message carrying the identifier of the second UE, so that the second UE enters a connected state.

Embodiment 7

Figure 8A:
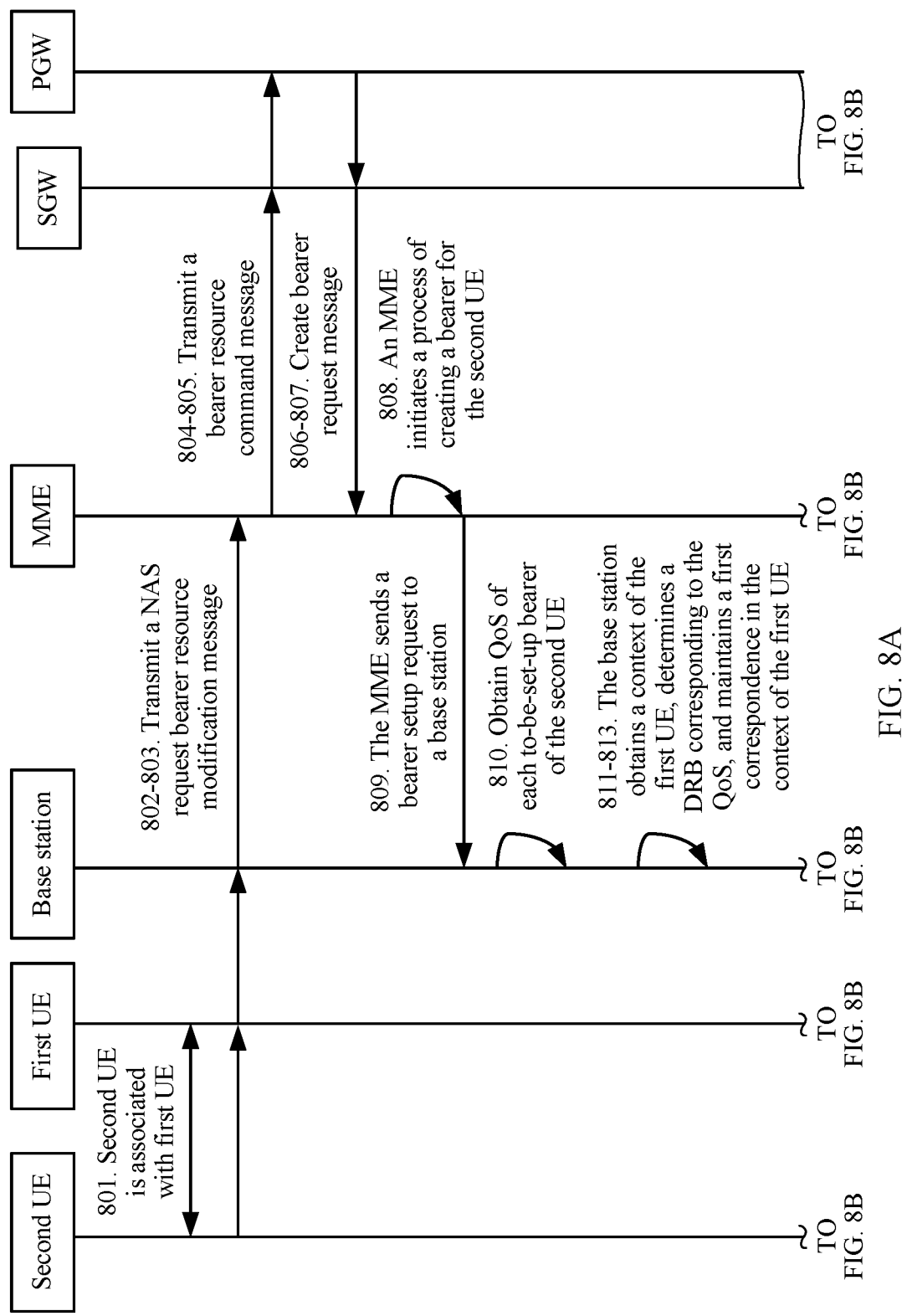
FIG. 8A and FIG. 8B are flowcharts of a method for accessing a network by UE according to Embodiment 7 of the present invention.
Figure 8B:
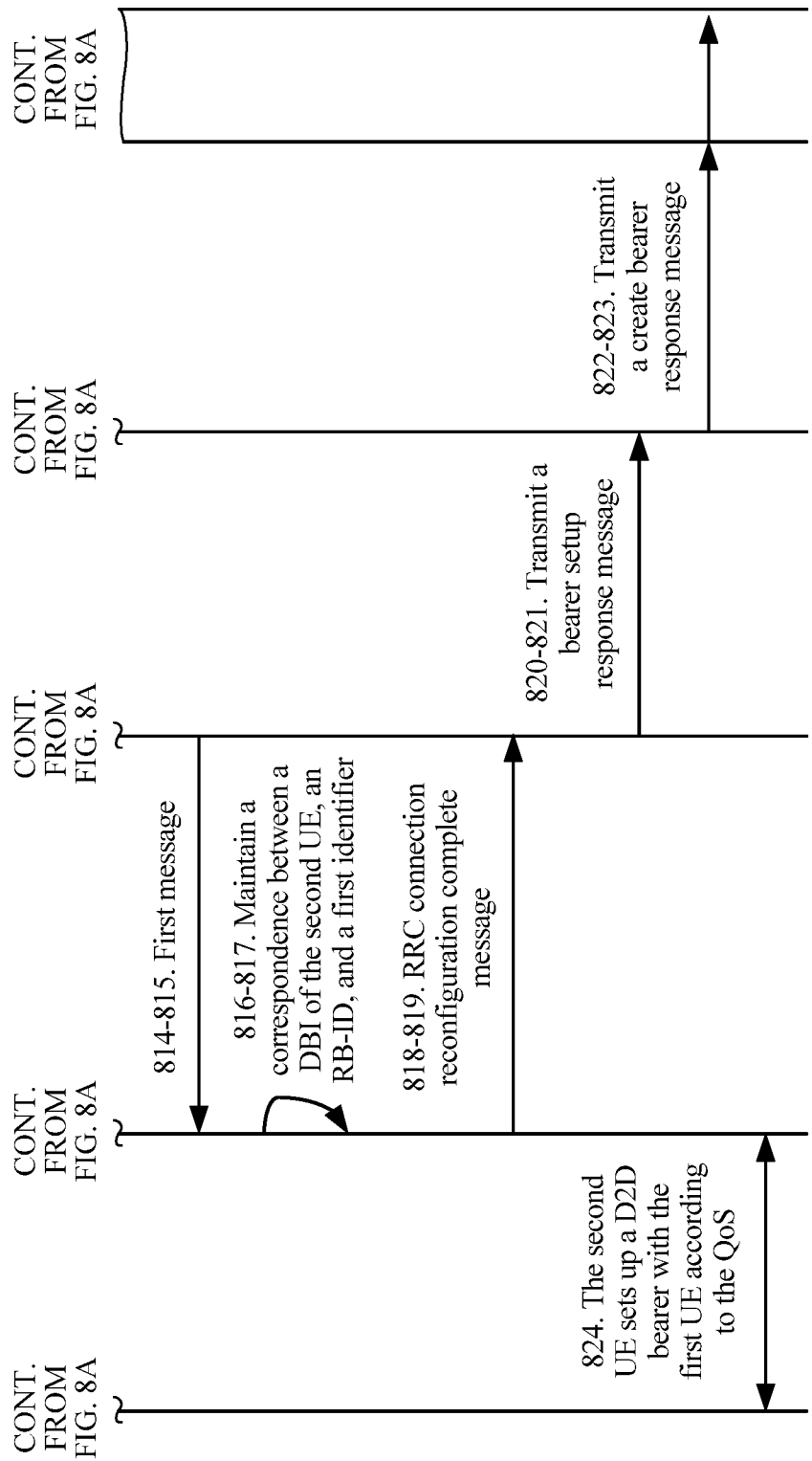

Embodiment 7 of the present invention provides a method for accessing a network by UE. As shown in FIG. 8A and FIG. 8B, a specific processing procedure of the method is as follows.

801. Second UE is associated with first UE and sets up a connection to the first UE.

The second UE is associated with the first UE by using an interface between the second UE and the first UE, and the second UE accesses a network by using the first UE.

802. The second UE sends a NAS request bearer resource modification message to an MME by using the first UE.

For a specific implementation of step 802, refer to the detailed descriptions of step 102 in Embodiment 1. Details are not described herein again.

803. The MME receives the NAS request bearer resource modification message.

804. The MME sends a bearer resource command message to a PGW by using an SGW.

805. The PGW receives the bearer resource command message by using the SGW.

806. The PGW sends a create bearer request message to the MME by using the SGW.

807. The MME receives the create bearer request message.

808. The MME initiates a process of creating a bearer for the second UE.

Optionally, the MME may allocate, to the second UE, a corresponding identifier of a communications link between the first UE and the second UE. The identifier of the communications link may be specifically a D2D bearer identity DBI or a slide link identity SLI. An example in which the identifier is the DBI is used for description in the following. In this case, a D2D bearer is specifically the communications link between the first UE and the second UE.

809. The MME sends a bearer setup request to a base station.

The bearer setup request is used to request to create an S1 bearer for the second UE.

The bearer setup request may include the following parameters: an identifier of the second UE and an E-RAB to Be Setup List. Each E-RAB to Be Setup in the E-RAB to Be Setup List includes the following parameters: an EBI and QoS.

Optionally, each E-RAB to Be Setup in the E-RAB to Be Setup List may further include the DBI.

Optionally, if there is a NAS connection between the second UE and the MME, the bearer setup request further includes an identifier of the first UE.

For steps 810 to 819, refer to the detailed descriptions of steps 108 to 117 in Embodiment 1. Details are not described herein again.

820. The base station sends a bearer setup response message to the MME.

821. The MME receives the bearer setup response message.

822. The MME sends a create bearer response message to the PGW by using the SGW.

823. The PGW receives the create bearer response message by using the SGW.

824. The second UE sets up a D2D bearer with the first UE according to the QoS.

Embodiment 8

Figure 9B:
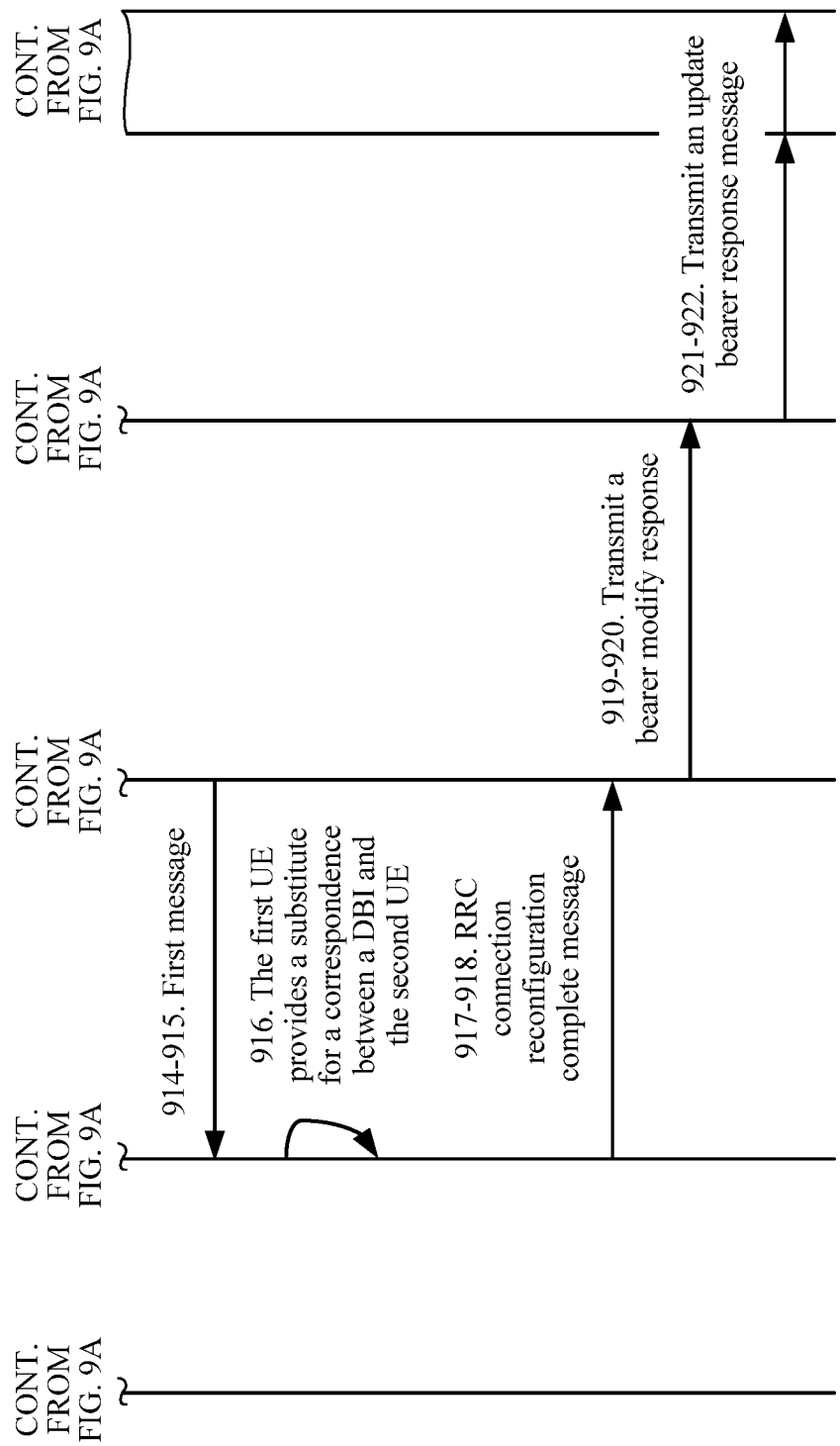

Embodiment 8 of the present invention provides a method for accessing a network by UE. As shown in FIG. 9A and FIG. 9B, a specific processing procedure of the method is as follows.

For steps 901 to 907, refer to the detailed descriptions of steps 801 to 807 in Embodiment 5. Details are not described herein again.

908. The MME sends a bearer modify request to a base station.

The bearer modify request is used to modify an S1 bearer for the second UE.

The bearer modify request includes the following parameters: an identifier of the second UE and parameters of a to-be-modified bearer.

The parameters of the to-be-modified bearer include an EBI and QoS. Optionally, the parameters of the to-be-modified bearer may further include a DBI.

909. The base station receives the bearer modify request.

910. The base station searches the first UE according to new QoS of a bearer of the second UE, to determine whether a corresponding DRB exists.

911. If a corresponding DRB exists in the first UE, the base station allocates a corresponding first identifier to the second UE.

912. If no corresponding DRB exists in the first UE, the base station sets up a corresponding DRB on the first UE and allocates a corresponding first identifier.

913. The base station stores a correspondence between a B-ID of the first UE, the first identifier, and an S1 TEID of the second UE.

If the base station maps a new DRB to the second UE, the base station deletes a mapping relationship between the second UE and an original DRB of the first UE.

For steps 914 and 915, refer to the detailed descriptions of steps 112 and 113 in Embodiment 1.

916. The first UE provides a substitute for a correspondence between a DBI and the second UE.

For steps 917 and 918, refer to the detailed descriptions of steps 116 and 117 in Embodiment 1. Details are not described herein again.

919. The base station sends a bearer modify response to the MME.

920. The MME receives the bearer modify response.

921. The MME sends an update bearer response message to the PGW by using the SGW.

922. The PGW receives the update bearer response message.

Embodiment 9

Figure 10:
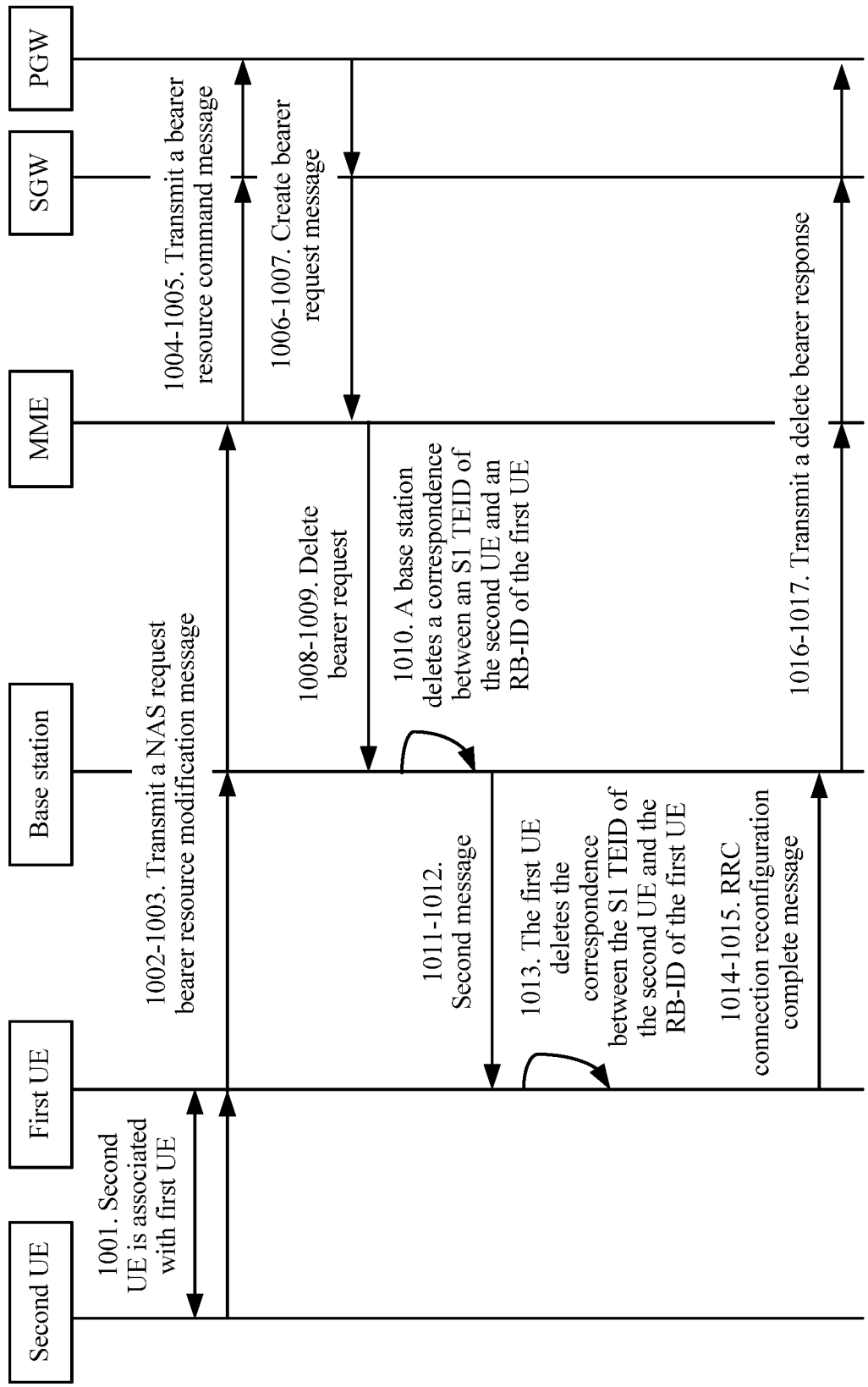
FIG. 10 is a flowchart of a method for accessing a network by UE according to Embodiment 9 of the present invention.
Figure 11:
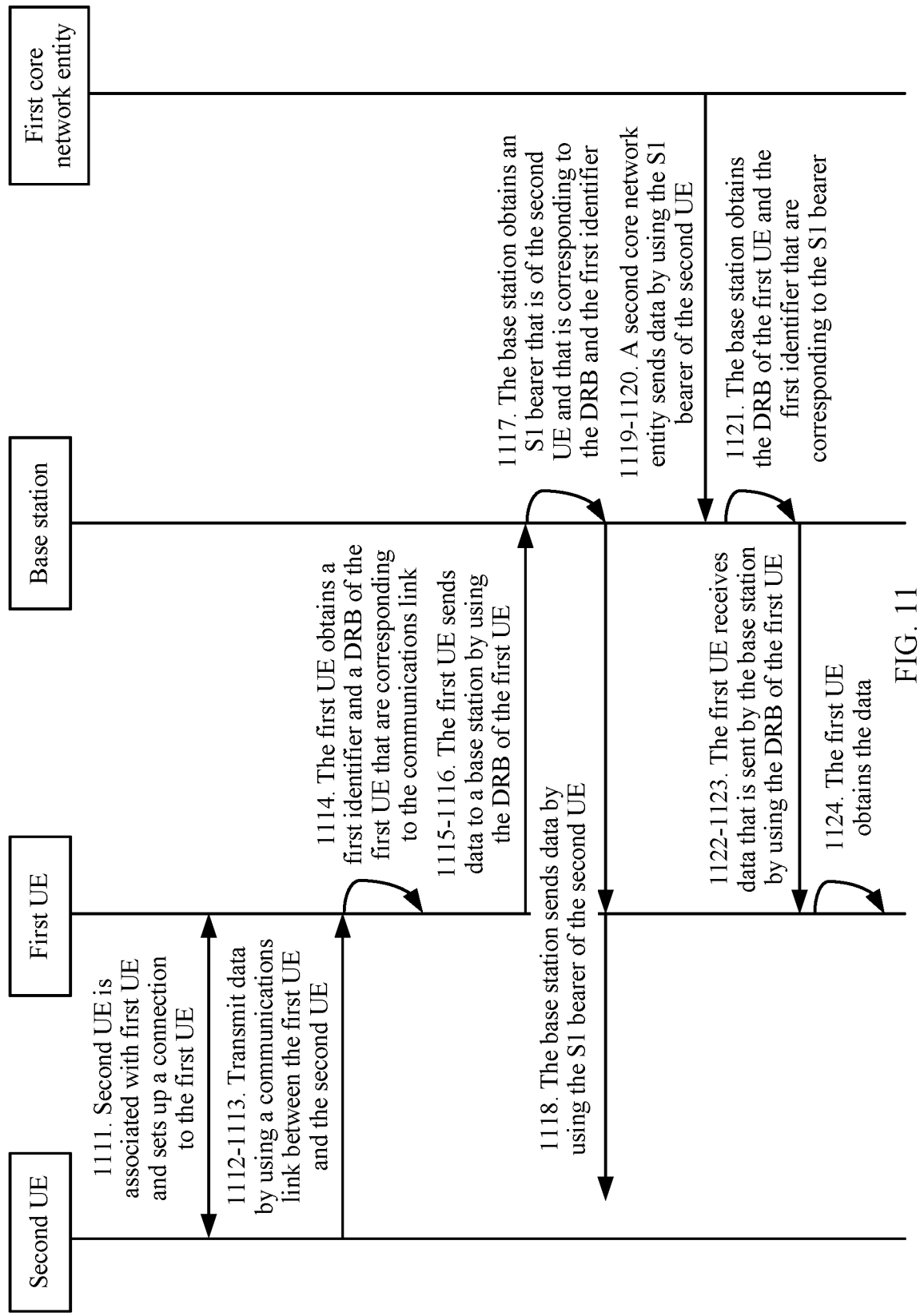
FIG. 11 is a flowchart of a method for accessing a network by UE according to Embodiment 10 of the present invention.

Embodiment 9 of the present invention provides a method for accessing a network by UE. As shown in FIG. 10, a specific processing procedure of the method is as follows.

For steps 1001 to 1007, refer to the detailed descriptions of steps 801 to 807 in Embodiment 6. Details are not described herein again.

1008. The MME sends a delete bearer request to a base station.

1009. The base station receives the delete bearer request.

1010. The base station deletes a correspondence between an S1 TEID of the second UE and an RB-ID of the first UE.

For example, the correspondence between the S1 TEID of the second UE and the RB-ID of the first UE is as follows: a correspondence between an RB-ID of the second UE+a first identifier and the S1 TEID of the second UE.

For steps 1011 and 1012, refer to the detailed descriptions of steps 112 and 113 in Embodiment 1.

1013. The first UE deletes the correspondence between the S1 TEID of the second UE and the RB-ID of the first UE.

For steps 1014 and 1015, refer to the detailed descriptions of steps 116 and 117 in Embodiment 1. Details are not described herein again.

1016. The base station sends a delete bearer response to the MME.

1017. The MME sends the delete bearer response message to the PGW by using the SGW.

Embodiment 10

Embodiment 10 of the present invention provides a method for accessing a network by UE. As shown in FIG. 1*i*, on an uplink, a specific processing procedure of the method is as follows.

1111. Second UE is associated with first UE and sets up a connection to the first UE.

The second UE is associated with the first UE by using an interface between the second UE and the first UE, and the second UE accesses a network by using the first UE.

1112. The second UE sends data by using a communications link between the first UE and the second UE.

1113. The first UE receives the data that is sent by the second UE by using the communications link between the first UE and the second UE.

1114. The first UE obtains a first identifier and a DRB of the first UE that are corresponding to the communications link.

The first UE obtains, by using a stored second correspondence, the first identifier and the DRB of the first UE that are corresponding to the communications link.

The second correspondence includes an identifier of the communications link between the first UE and the second UE, an identifier of the DRB of the first UE, and the first identifier. The identifier of the DRB of the first UE is used to identify the DRB of the first UE, and the identifier of the communications link between the first UE and the second UE is used to identify the communications link between the first UE and the second UE.

The first UE stores the second correspondence in the following manners.

In a first manner, the first UE receives a message that is sent by a base station and that includes the first identifier, the identifier of the DRB of the first UE, and the identifier of the communications link between the first UE and the second UE, and the first UE stores the second correspondence. The second correspondence includes the first identifier, the identifier of the DRB of the first UE, and the identifier of the communications link between the first UE and the second UE.

In a second manner, the first UE receives a message that is sent by a base station and that includes the first identifier and the identifier of the DRB of the first UE, and the first UE obtains the identifier that is of the communications link between the first UE and the second UE and that is corresponding to the identifier of the DRB of the first UE. The first UE stores the second correspondence.

1115. The first UE sends data to a base station by using the DRB of the first UE.

A PDU carrying the data that is sent by using the DRB of the first UE includes the first identifier.

1116. The base station receives the data that is sent by the first UE by using the DRB of the first UE.

1117. The base station obtains an S1 bearer that is of the second UE and that is corresponding to the DRB and the first identifier.

The base station obtains, by using a stored first correspondence, the S1 bearer that is of the second UE and that is corresponding to the DRB and the first identifier.

The first correspondence includes an identifier of the S1 bearer of the second UE, the identifier of the DRB of the first UE, and the first identifier. The identifier of the DRB of the first UE is used to identify the DRB of the first UE, and the identifier of the S1 bearer of the second UE is used to identify the S1 bearer of the second UE.

1118. The base station sends data by using the S1 bearer of the second UE.

On a downlink, a specific processing procedure of the method is as follows.

1119. A second core network entity sends data by using the S1 bearer of the second UE.

1120. The base station receives the data that is sent by the second core network entity by using the S1 bearer of second UE.

1121. The base station obtains the DRB of the first UE and the first identifier that are corresponding to the S1 bearer.

The base station obtains, by using the stored first correspondence, the DRB of the first UE and the first identifier that are corresponding to the S1 bearer.

The first correspondence includes the identifier of the S1 bearer of the second UE, the identifier of the DRB of the first UE, and the first identifier. The identifier of the DRB of the first UE is used to identify the DRB of the first UE, and the identifier of the S1 bearer of the second UE is used to identify the S1 bearer of the second UE.

For a specific implementation of storing the first correspondence by the base station, refer to the detailed descriptions in Embodiment 1. Details are not described again.

1122. The base station sends data by using the DRB of the first UE.

A PDU carrying the data that is sent by using the DRB of the first UE includes the first identifier.

1123. The first UE receives the data that is sent by the base station by using the DRB of the first UE.

1124. The first UE obtains the communications link that is between the first UE and the second UE and that is corresponding to the DRB and the first identifier, and sends the data to the second UE by using the communications link.

The first UE obtains, from the stored second correspondence, the communications link that is between the first UE and the second UE and that is corresponding to the DRB and the first identifier.

The second correspondence includes the identifier of the communications link between the first UE and the second UE, the identifier of the DRB of the first UE, and the first identifier. The identifier of the DRB of the first UE is used to identify the DRB of the first UE, and the identifier of the communications link between the first UE and the second UE is used to identify the communications link between the first UE and the second UE.

The first UE obtains the second correspondence in the following manners.

In a first manner, the first UE receives a message that is sent by the base station and that includes the first identifier, the identifier of the DRB of the first UE, and the identifier of the communications link between the first UE and the second UE, and the first UE stores the second correspondence.

The second correspondence includes the first identifier, the identifier of the DRB of the first UE, and the identifier of the communications link between the first UE and the second UE.

In a second manner, the first UE receives a message that is sent by the base station and that includes the first identifier and the identifier of the DRB of the first UE, the first UE obtains the identifier that is of the communications link between the first UE and the second UE and that is corresponding to the identifier of the DRB of the first UE, and the first UE stores the second correspondence.

Embodiment 11

Figure 12:
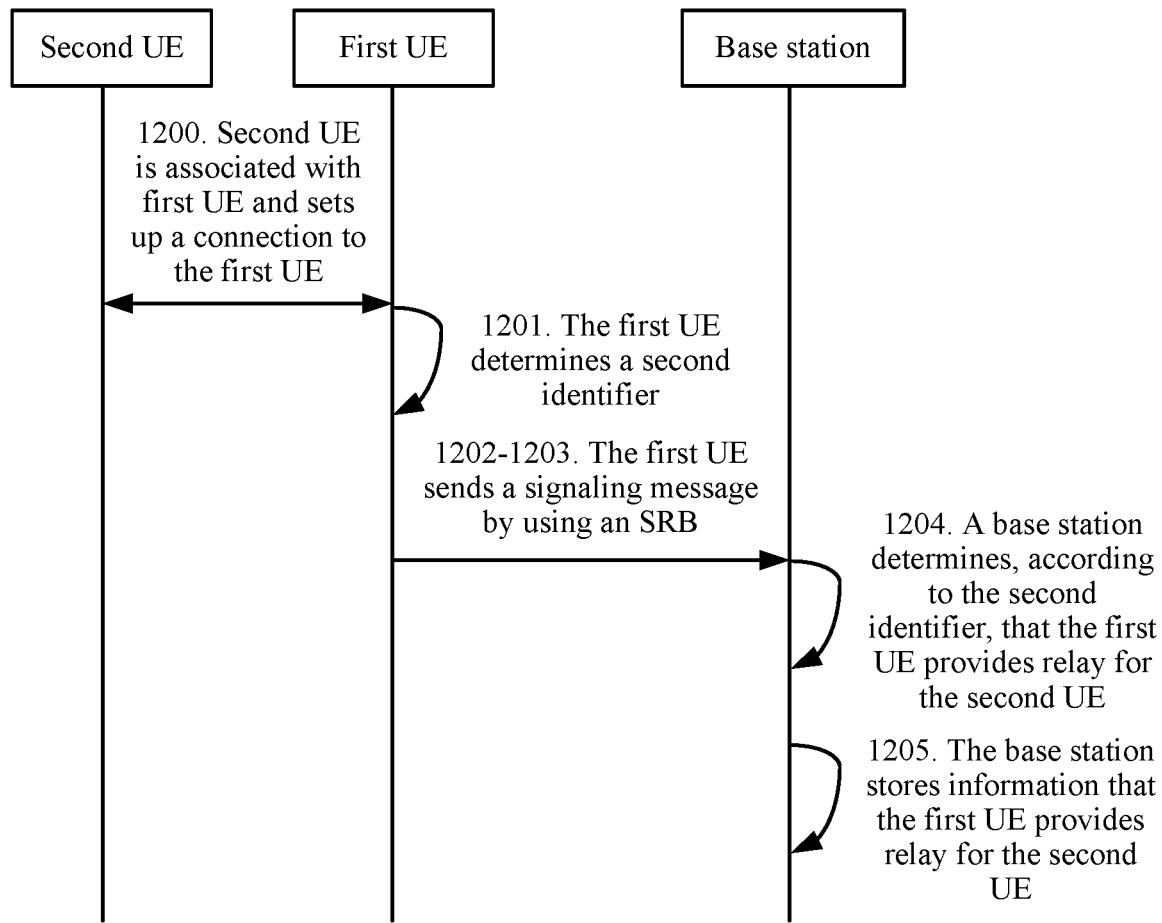
FIG. 12 is a flowchart of a method for accessing a network by UE according to Embodiment 11 of the present invention.

Embodiment 11 of the present invention provides a method for accessing a network by UE. As shown in FIG. 12, a specific processing procedure of the method is as follows.

1200. Second UE is associated with first UE and sets up a connection to the first UE.

For a specific implementation in which the second UE is associated with the first UE and sets up a connection to the first UE, refer to the detailed descriptions in Embodiment 2. Details are not described herein again.

1201. The first UE determines a second identifier.

The second identifier is used to indicate that signaling transmitted in an SRB of the first UE belongs to the second UE, or the second identifier is used to identify the second UE.

1202. The first UE sends a signaling message by using an SRB.

A PDU carrying the signaling message includes the second identifier.

1203. A base station receives the signaling message that is sent by the first UE by using the SRB.

1204. The base station determines, according to the second identifier, that the first UE provides relay for the second UE.

1205. The base station stores information that the first UE provides relay for the second UE.

Optionally, on a terminal side, before the first UE determines the second identifier, the method further includes: sending, by the first UE to the base station, a signaling message that is used to request the base station to allocate the second identifier to the second UE, and receiving, by the first UE, a signaling message that is sent by the base station and that includes the second identifier.

The first UE stores a correspondence between the second identifier and an identifier of the second UE.

Optionally, after the first UE stores the correspondence between the second identifier and the identifier of the second UE, the method further includes: receiving, by the first UE, a signaling message sent by the second UE, obtaining, by the first UE, the second identifier corresponding to the identifier of the second UE, and sending, by the first UE, the signaling message of the second UE by using the SRB of the first UE, where a packet data unit PDU carrying the signaling message includes the second identifier; or receiving, by the first UE, a signaling message that is sent by the base station by using the SRB of the first UE, where a PDU carrying the signaling message includes the second identifier, obtaining, by the first UE, the identifier that is of the second UE and that is corresponding to the second identifier, and sending the signaling message of the second UE to the second UE.

Correspondingly, on a network side, optionally, before step 1203, the method may further include: receiving, by the base station, the signaling message that is sent by the first UE and that is used to request the base station to allocate the second identifier to the second UE; and sending, by the base station, the signaling message including the second identifier to the first UE.

Optionally, after step 1204, the method may further include: storing, by the base station, a correspondence between the second identifier, the SRB of the first UE, and an S1 application protocol S1-AP of the second UE.

Optionally, after step 1205, the method may further include: receiving, by the base station, an RRC message that is sent by the first UE by using the SRB of the first UE and that carries a NAS message, where a PDU carrying the RRC message includes the second identifier; obtaining, by the base station, the S1-AP that is of the second UE and that is corresponding to the SRB of the first UE and the second identifier; and sending, by the base station, the NAS message to a first core network entity by using the S1-AP of the second UE; or receiving, by the base station, an S1-AP message that is sent by a first core network to the second UE by using the S1-AP of the second UE and that carries a NAS message; obtaining, by the base station, the SRB of the first UE and the second identifier that are corresponding to the S1-AP; and sending, by the base station by using the SRB of the first UE, an RRC message including the NAS message to the first UE, where a PDU carrying the RRC message includes the second identifier.

Embodiment 12

Figure 13:
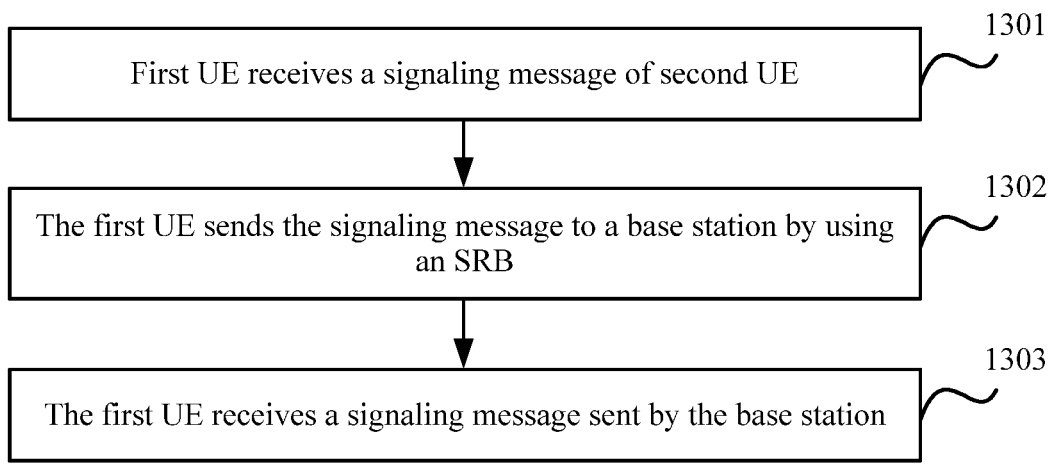
FIG. 13 is a flowchart of a method for accessing a network by UE according to Embodiment 12 of the present invention.

Embodiment 12 of the present invention provides a method for accessing a network by UE. As shown in FIG. 13, the method includes the following steps.

1301. First UE receives a signaling message of second UE.

1302. The first UE sends the signaling message to a base station by using an SRB.

1303. The first UE receives a signaling message sent by the base station.

The signaling message received by the first UE includes a second identifier that is used to: when the first UE transmits signaling for the second UE by using the SRB, indicate that a signaling message transmitted in the SRB of the first UE belongs to the second UE.

Optionally, the method further includes: storing, by the first UE, a correspondence between the second identifier and an identifier of the second UE.

After the first UE stores the correspondence between the second identifier, the SRB of the first UE, and the identifier of the second UE, the method further includes: receiving, by the first UE, an RRC message sent by the second UE, obtaining, by the first UE, the second identifier corresponding to the first UE, and sending the RRC message of the second UE by using the SRB of the first UE, where the RRC message includes the second identifier; or receiving, by the first UE, an RRC message that is sent by the base station by using the SRB of the first UE, where the RRC message includes the second identifier, obtaining, by the first UE, the identifier that is of the second UE and that is corresponding to the second identifier, and sending the RRC message to the second UE.

Embodiment 13

Figure 14A:
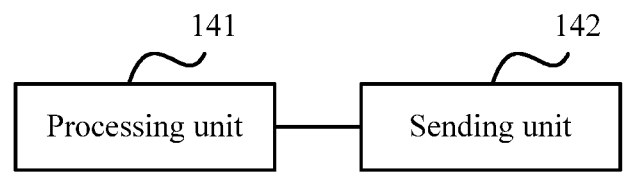
FIG. 14a to FIG. 14e are schematic diagrams of structural composition of a base station according to Embodiment 13 of the present invention.

This embodiment of the present invention provides a base station. As shown in FIG. 14a, the base station includes: a processing unit 141, configured to determine that first UE provides relay for the second UE; and a sending unit 142, configured to send a first message including a first identifier to the first UE, where the first message is used to manage a data radio bearer DRB of the first UE, so that the DRB of the first UE is used to transmit data of the second UE, and the first identifier is in a one-to-one correspondence with the second UE.

The first identifier sent by the sending unit 142 is specifically used to indicate that data transmitted by using the DRB of the first UE belongs to the second UE, or the first identifier is used to identify the second UE.

Optionally, the base station further includes: a receiving unit, configured to receive a second message that is sent by a first core network entity and that is used to manage a bearer of the second UE. The processing unit is further configured to: obtain, according to the second message, quality of service QoS of a DRB that needs to be used by the second UE; and when determining that a DRB meeting the QoS requirement exists in the first UE, determine to modify the DRB meeting the QoS requirement in the first UE, so that the DRB of the first UE is used to transmit data of the second UE; or when determining that no DRB meeting the QoS requirement exists in the first UE, set up, on the first UE, a DRB meeting the QoS requirement.

The processing unit 141 is further configured to: allocate the first identifier to the second UE; or receive a third message that is sent by a first core network entity and that includes the first identifier, and obtain the first identifier from the received third message.

The base station further includes: the receiving unit, configured to receive data that is sent by using the DRB of the first UE. The processing unit is specifically configured to obtain an S1 bearer that is of the second UE and that is corresponding to the DRB and the first identifier. The sending unit is specifically configured to send the data to a second core network entity by using the S1 bearer. Alternatively, the base station further includes: the receiving unit, configured to receive data that is sent by the second core network entity to the second UE by using an S1 bearer of the second UE. The processing unit is specifically configured to obtain the first identifier and the DRB of the first UE that are corresponding to the S1 bearer. The sending unit is specifically configured to send the data by using the DRB of the first UE. A PDU carrying the data that is sent by using the DRB of the first UE includes the first identifier.

The base station further includes: a storage unit, configured to store a first correspondence. The processing unit is specifically configured to obtain, by using the stored first correspondence, the first identifier and the DRB of the first UE that are corresponding to the S1 bearer. The first correspondence includes an identifier of the DRB of the first UE, the first identifier, and an identifier of the S1 bearer of the second UE. The identifier of the DRB of the first UE is used to identify the DRB of the first UE, and the identifier of the S1 bearer of the second UE is used to identify the S1 bearer of the second UE.

The base station further includes: a storage unit, configured to store a first correspondence. The processing unit is specifically configured to obtain, by using the stored first correspondence, the S1 bearer that is of the second UE and that is corresponding to the DRB and the first identifier. The first correspondence includes an identifier of the DRB of the first UE, the first identifier, and an identifier of the S1 bearer of the second UE. The identifier of the DRB of the first UE is used to identify the DRB of the first UE, and the identifier of the S1 bearer of the second UE is used to identify the S1 bearer of the second UE.

The processing unit 141 is specifically configured to determine, in one of the following manners, that the first UE provides relay for the second UE: receiving a second message that is sent by a first core network entity and that is used to manage a bearer of the second UE, where the second message includes an identifier of the first UE; and determining, according to the identifier of the first UE, that the first UE provides relay for the second UE; receiving a second message that is sent by a first core network entity and that is used to manage a bearer of the second UE, where the second message includes an identifier of the first UE and a first indication; and determining, according to the identifier of the first UE and the first indication, that the first UE provides relay for the second UE, where the first indication is used to instruct the second UE to access a network by using a relay; or storing information that the first UE provides relay for the second UE, and determining, according to the information, that the first UE provides relay for the second UE.

The processing unit 141 is specifically configured to: receive a signaling message that is sent by using a signaling radio bearer SRB of the first UE, where a PDU carrying the signaling message includes a second identifier, and the second identifier is used to indicate that a signaling message transmitted in the SRB of the first UE belongs to the second UE; and determine, according to the second identifier, that the first UE provides relay for the second UE, and store the information that the first UE provides relay for the second UE.

The base station further includes: a receiving unit, configured to receive a message that is sent by the first UE and that is used by the first UE to request the base station to allocate the second identifier to the second UE. The processing unit is further configured to allocate the second identifier to the second UE. The sending unit is further configured to send a message including the second identifier to the first UE.

The sending unit is specifically configured to send the first message including the first identifier to the first UE. The first message further includes an identifier that is used to identify a communications link between the first UE and the second UE, so that the first UE stores a second correspondence. The second correspondence includes an identifier of the DRB of the first UE, the first identifier, and the identifier that is used to identify the communications link between the first UE and the second UE.

The first identifier sent by the sending unit includes one of the following identifiers: a Packet Data Convergence Protocol identifier PDCP ID, a Radio Link Control identifier RLC ID, or a Media Access Control identifier MAC ID.

The second identifier determined by the processing unit includes one of the following identifiers: a PDCP ID, an RLC ID, or a MAC ID.

Figure 14B:
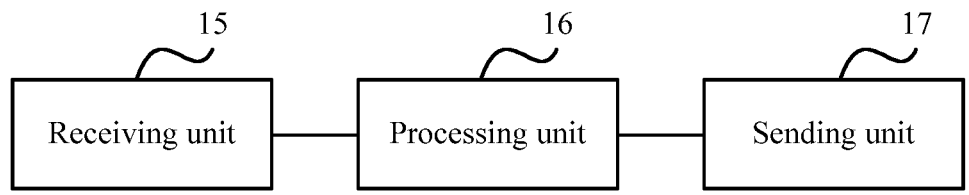

Correspondingly, Embodiment 14 of the present invention further provides a base station. As shown in FIG. 14b, the base station includes: a receiving unit 15, configured to receive data that is sent by first UE by using a DRB of the first UE, where a packet data unit PDU carrying the data that is sent by using the DRB of the first UE includes a first identifier; a processing unit 16, configured to obtain an S1 bearer that is of second UE and that is corresponding to the DRB and the first identifier; and a sending unit 17, configured to send the data by using the S1 bearer of the second UE, where the first identifier is in a one-to-one correspondence with the second UE.

Specifically, the first identifier received by the receiving unit 15 is used to indicate that data transmitted in the DRB of the first UE belongs to the second UE, or the first identifier is used to identify the second UE.

The processing unit 16 is specifically configured to obtain, by using a stored first correspondence, the S1 bearer that is of the second UE and that is corresponding to the DRB and the first identifier. The first correspondence includes an identifier of the S1 bearer of the second UE, an identifier of the DRB of the first UE, and the first identifier. The identifier of the DRB of the first UE is used to identify the DRB of the first UE, and the identifier of the S1 bearer of the second UE is used to identify the S1 bearer of the second UE.

Figure 14C:
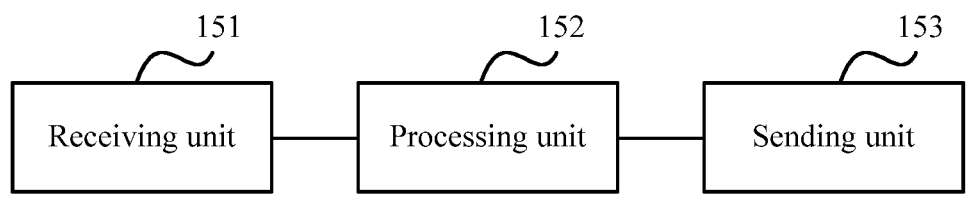

Correspondingly, this embodiment of the present invention further provides a base station. As shown in FIG. 14c, the base station includes: a receiving unit 151, configured to receive data that is sent by a second core network entity by using an S1 bearer of second UE; a processing unit 152, configured to obtain a DRB of first UE and a first identifier that are corresponding to the S1 bearer; and a sending unit 153, configured to send the data by using the DRB of the first UE, where a packet data unit PDU carrying the data that is sent by using the DRB of the first UE includes the first identifier, and the first identifier is in a one-to-one correspondence with the second UE.

Specifically, the first identifier obtained by the processing unit 152 is used to indicate that data transmitted in the DRB of the first UE belongs to the second UE, or the first identifier is used to identify the second UE.

The processing unit 152 is specifically configured to obtain, by using a stored first correspondence, the DRB of the first UE and the first identifier that are corresponding to the S1 bearer. The first correspondence includes an identifier of the S1 bearer of the second UE, an identifier of the DRB of the first UE, and the first identifier. The identifier of the DRB of the first UE is used to identify the DRB of the first UE, and the identifier of the S1 bearer of the second UE is used to identify the S1 bearer of the second UE.

Figure 14D:
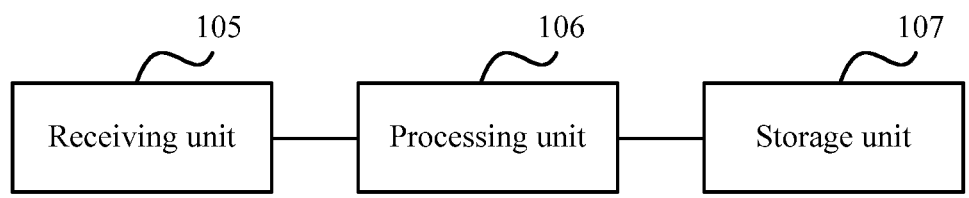

Correspondingly, this embodiment of the present invention provides a base station. As shown in FIG. 14d, the base station includes: a receiving unit 105, configured to receive a signaling message that is sent by first UE by using a signaling radio bearer SRB, where a packet data unit PDU carrying the signaling message includes a second identifier; a processing unit 106, configured to determine, according to the second identifier, that the first UE provides relay for the second UE; and a storage unit 107, configured to store information that the first UE provides relay for the second UE.

The second identifier is in a one-to-one correspondence with the second UE.

Specifically, the second identifier received by the receiving unit 105 is used to indicate that signaling transmitted in the SRB of the first UE belongs to the second UE, or the second identifier is used to identify the second UE.

Specifically, the receiving unit 105 is further configured to receive a signaling message that is sent by the first UE and that is used to request the base station to allocate the second identifier to the second UE; and the sending unit is further configured to send a signaling message including the second identifier to the first UE.

Specifically, the storage unit 107 is further configured to store a correspondence between the second identifier, the SRB of the first UE, and an S1 application protocol S1-AP of the second UE.

Specifically, the receiving unit 105 is further configured to receive an RRC message that is sent by the first UE by using the signaling radio bearer SRB of the first UE and that carries a NAS message, where a PDU carrying the RRC message includes the second identifier; the processing unit is further configured to obtain the S1-AP that is of the second UE and that is corresponding to the SRB of the first UE and the second identifier; and the sending unit is further configured to send the NAS message to a first core network entity by using the S1-AP of the second UE.

Specifically, the receiving unit 105 is further configured to receive an S1-AP message that is sent by a first core network to the second UE by using the S1-AP of the second UE and that carries a NAS message; the processing unit is further configured to obtain the SRB of the first UE and the second identifier that are corresponding to the S1-AP; and the sending unit is further configured to send, by using the SRB of the first UE, an RRC message including the NAS message to the first UE, where a PDU carrying the RRC message includes the second identifier.

Figure 14E:
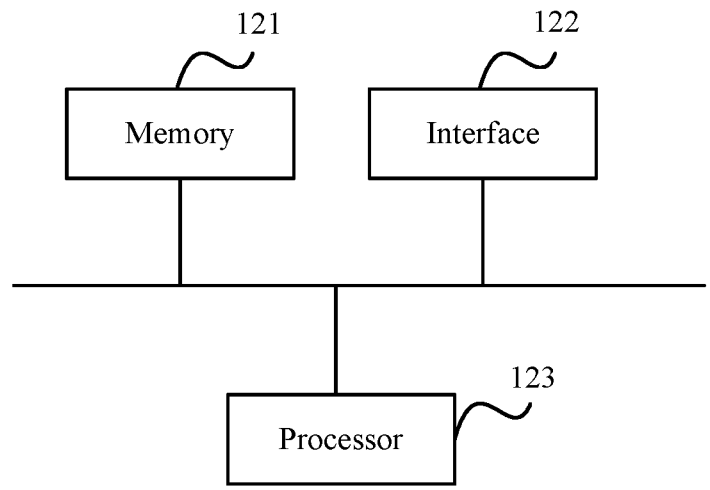

This embodiment of the present invention further provides a base station. As shown in FIG. 14e, the base station may mainly include a memory 121, an interface 122, and a processor 123. The memory 121 may complete functions of the storage unit and the like. The interface 122 may be a receiver, a transmitter, or the like, and may complete functions of the sending unit, the receiving unit, and the like. Details are not described again. The processor 123 may complete specific functions of the processing unit and the like. Details are not described again.

The interface may be one or more of the following: a network interface controller (NIC) that provides a wired interface, for example, an Ethernet NIC that can provide a copper interface and/or a fiber interface; or a NIC that provides a wireless interface, for example, a wireless local area network (WLAN) NIC.

The memory may be a volatile memory, for example, a random-access memory (RAM); or a nonvolatile memory, for example, a flash memory, a hard disk (HDD), or a solid-state drive (SSD); or a combination of the foregoing types of memories.

The processor may be a central processing unit (CPU), or a combination of a CPU and a hardware chip. Alternatively, the processor may be a network processor (NP), or a combination of a CPU and an NP, or a combination of an NP and a hardware chip.

The hardware chip may be one or a combination of the following: an application-specific integrated circuit (ASIC), a field programmable gate array (FPGA), or a complex programmable logical device (CPLD).

Embodiment 14

Figure 15A:
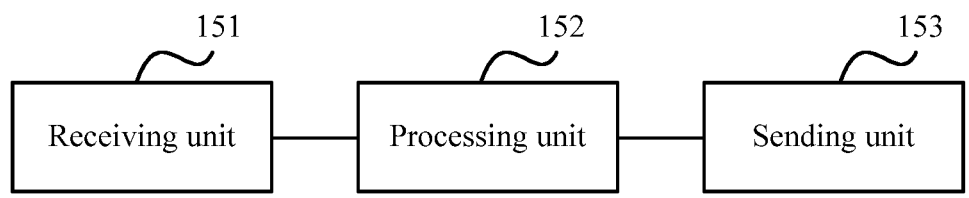
FIG. 15a and FIG. 15b are schematic diagrams of structural composition of a first core network entity according to Embodiment 14 of the present invention.

Embodiment 14 of the present invention provides a first core network entity. As shown in FIG. 15a, the first core network entity includes: a receiving unit 151, configured to receive a message that is sent by first UE and that is used to request to enter a connected state from an idle state; a processing unit 152, configured to determine that the first UE provides relay for second UE; and a sending unit 153, configured to send a second message to the base station when it is determined that the first UE provides relay for the second UE, where the second message is used to manage a bearer of the second UE, and the second message includes context information of the bearer of the second UE.

The receiving unit 151 is specifically configured to: receive the message that is sent by the first UE and that is used to request to enter the connected state from the idle state, where the message that is used to request to enter the connected state from the idle state includes an identifier of the second UE; obtain the identifier of the second UE; and obtain the context information of the bearer of the second UE according to the identifier of the second UE.

The sending unit 153 is specifically configured to send the second message to the base station. The second message includes an identifier of the first UE, and the identifier of the first UE is used by the base station to determine that the first UE provides relay for the second UE.

The sending unit 153 is specifically configured to send the second message to the base station. The second message includes an identifier of the first UE and a first indication. The identifier of the first UE is used by the base station to determine that the first UE provides relay for the second UE, and the first indication is used to instruct the second UE to access a network by using a relay.

The sending unit 153 is specifically configured to: obtain a first identifier, and send a first message to the base station. The first message includes the first identifier, and the first identifier is in a one-to-one correspondence with the second UE.

Specifically, the first identifier sent by the sending unit 153 is used to indicate that data transmitted in a DRB of the first UE belongs to the second UE, or the first identifier is used to identify the second UE.

Figure 15B:
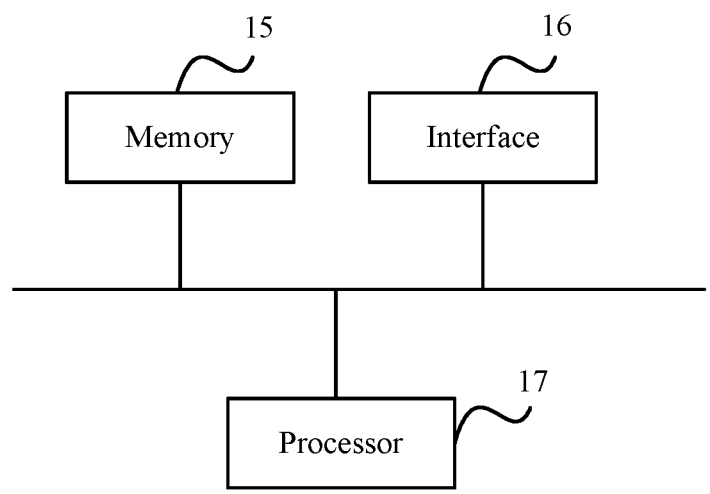

Embodiment 14 of the present invention further provides a core network entity. As shown in FIG. 15b, the core network entity mainly includes a memory 15, an interface 16, and a processor 17.

The memory 15 is configured to: implement a data storage function, and store program code. The processor 17 is configured to implement a corresponding function of the processing unit. The processor may obtain the stored program code from the memory 15, to perform a corresponding procedure according to the obtained program code. The interface 16 may implement specific functions of the sending unit and the receiving unit. Details are not described again.

The interface may be one or more of the following: a NIC that provides a wired interface, for example, an Ethernet NIC that can provide a copper interface and/or a fiber interface; or a NIC that provides a wireless interface, for example, a WLAN NIC.

The memory may be a volatile memory, for example, a RAM; or a non-volatile memory, for example, a flash memory, an HDD, or an SSD; or a combination of the foregoing types of memories.

The processor may be a CPU, or a combination of a CPU and a hardware chip. Alternatively, the processor may be an NP, or a combination of a CPU and an NP, or a combination of an NP and a hardware chip.

The hardware chip may be one or a combination of the following: an ASIC, an FPGA, or a CPLD.

Embodiment 15

Figure 16A:
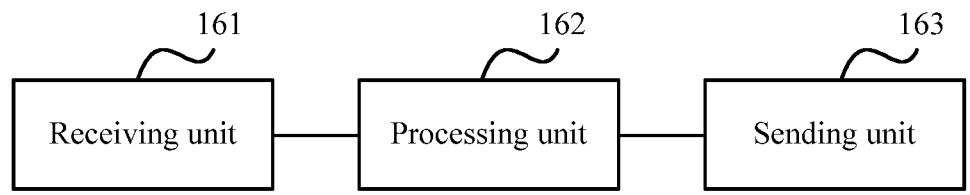
FIG. 16a to FIG. 16d are schematic diagrams of structural composition of UE according to Embodiment 15 of the present invention.

Embodiment 15 of the present invention provides first UE. As shown in FIG. 16a, the first UE includes: a receiving unit 161, configured to receive data that is sent by second UE by using a communications link between the first UE and the second UE; a processing unit 162, configured to obtain a first identifier and a DRB of the first UE that are corresponding to the communications link; and a sending unit 163, configured to send the data to a base station by using the DRB of the first UE, where a packet data unit PDU carrying the data that is sent by using the DRB of the first UE includes the first identifier, and the first identifier is in a one-to-one correspondence with the second UE.

Specifically, the first identifier sent by the sending unit 163 is used to indicate that data transmitted in the DRB belongs to the second UE, or the first identifier is used to identify the second UE.

The processing unit 162 is specifically configured to obtain, by using a stored second correspondence, the first identifier and the DRB of the first UE that are corresponding to the communications link. The second correspondence includes an identifier of the communications link between the first UE and the second UE, an identifier of the DRB of the first UE, and the first identifier. The identifier of the DRB of the first UE is used to identify the DRB of the first UE, and the identifier of the communications link between the first UE and the second UE is used to identify the communications link between the first UE and the second UE.

The processing unit 162 is specifically configured to store the second correspondence in the following manner: receiving, by the first UE, a message that is sent by the base station and that includes the first identifier, the identifier of the DRB of the first UE, and the identifier of the communications link between the first UE and the second UE, and storing, by the first UE, the second correspondence, where the second correspondence includes the first identifier, the identifier of the DRB of the first UE, and the identifier of the communications link between the first UE and the second UE; or receiving, by the first UE, a message that is sent by the base station and that includes the first identifier and the identifier of the DRB of the first UE, obtaining, by the first UE, the identifier that is of the communications link between the first UE and the second UE and that is corresponding to the identifier of the DRB of the first UE, and storing, by the first UE, the second correspondence, where the second correspondence includes the first identifier, the identifier of the DRB of the first UE, and the identifier of the communications link between the first UE and the second UE.

Figure 16B:
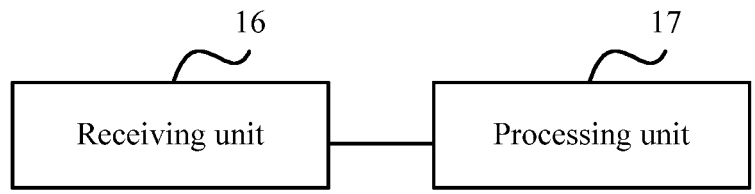

This embodiment of the present invention further provides first UE. As shown in FIG. 16b, the first UE includes: a receiving unit 16, configured to receive data that is sent by a base station by using a DRB of the first UE, where a packet data unit PDU carrying the data that is sent by using the DRB of the first UE includes a first identifier; and a processing unit 17, configured to: obtain a communications link that is between the first UE and the second UE and that is corresponding to the DRB and the first identifier, and send the data to the second UE by using the communications link, where the first identifier is in a one-to-one correspondence with the second UE.

Specifically, the first identifier sent by the processing unit 17 is used to indicate that data transmitted in the DRB of the first UE belongs to the second UE, or the first identifier is used to identify the second UE.

The processing unit 17 is specifically configured to obtain, by using a stored second correspondence, the communications link that is between the first UE and the second UE and that is corresponding to the DRB and the first identifier. The second correspondence includes an identifier of the communications link between the first UE and the second UE, an identifier of the DRB of the first UE, and the first identifier. The identifier of the DRB of the first UE is used to identify the DRB of the first UE, and the identifier of the communications link between the first UE and the second UE is used to identify the communications link between the first UE and the second UE.

Specifically, the processing unit 17 stores the second correspondence in the following manner: receiving a message that is sent by the base station and that includes the first identifier, the identifier of the DRB of the first UE, and the identifier of the communications link between the first UE and the second UE, and storing, by the first UE, the second correspondence, where the second correspondence includes the first identifier, the identifier of the DRB of the first UE, and the identifier of the communications link between the first UE and the second UE; or receiving a message that is sent by the base station and that includes the first identifier and the identifier of the DRB of the first UE, obtaining, by the first UE, the identifier that is of the communications link between the first UE and the second UE and that is corresponding to the identifier of the DRB of the first UE, and storing, by the first UE, the second correspondence, where the second correspondence includes the first identifier, the identifier of the DRB of the first UE, and the identifier of the communications link between the first UE and the second UE.

Figure 16C:
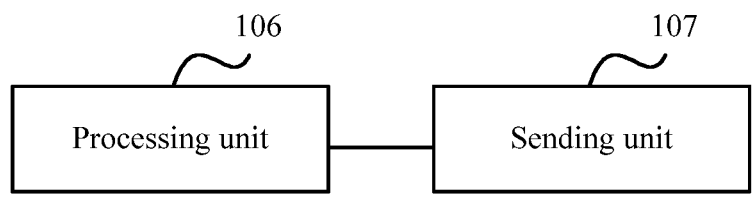

Correspondingly, this embodiment of the present invention further provides first UE. As shown in FIG. 16c, the first UE includes: a processing unit 106, configured to determine a second identifier; and a sending unit 107, configured to send, by using a radio bearer SRB, a signaling message including the second identifier to a base station, where the second identifier is in a one-to-one correspondence with the second UE.

Specifically, the second identifier determined by the processing unit 106 is used to indicate that a signaling message transmitted in the SRB of the first UE belongs to the second UE, or the second identifier is used to identify the second UE.

Specifically, the sending unit 107 is further configured to send, to the base station, a signaling message that is used to request the base station to allocate the second identifier to the second UE.

The first UE further includes: a receiving unit, configured to receive a signaling message that is sent by the base station and that includes the second identifier.

The first UE further includes: a storage unit, configured to store a correspondence between the second identifier and an identifier of the second UE.

The processing unit 106 is specifically configured to: receive a signaling message sent by the second UE, obtain the second identifier corresponding to the identifier of the second UE, and send the signaling message of the second UE by using the SRB of the first UE, where a packet data unit PDU carrying the signaling message includes the second identifier; or receive a signaling message that is sent by the base station by using the SRB of the first UE, where a PDU carrying the signaling message includes the second identifier, obtain, by the first UE, the identifier that is of the second UE and that is corresponding to the second identifier, and send the signaling message of the second UE to the second UE.

Specifically, the signaling message sent by the sending unit includes one of the following messages: an RRC message, a PDCP message, an RLC message, or a MAC message.

Figure 16D:
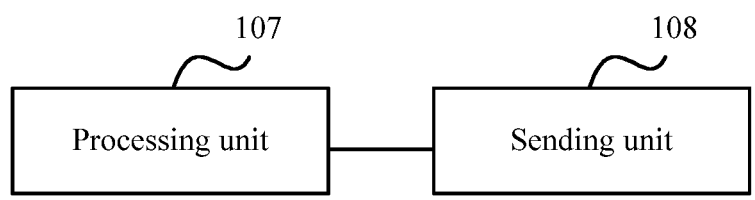

Correspondingly, Embodiment 15 of the present invention further provides first UE. As shown in FIG. 16*d*, the first UE includes: a processing unit 107, configured to receive a signaling message of second UE; and a sending unit 108, configured to send the signaling message to a base station by using a radio bearer SRB.

The processing unit 107 is further configured to receive a signaling message that is sent by the base station and that includes a second identifier. When the first UE transmits signaling for the second UE by using the SRB, the second identifier is used to indicate that a signaling message transmitted in the SRB of the first UE belongs to the second UE.

The first UE further includes: a storage unit, configured to store a correspondence between the second identifier, the SRB of the first UE, and an identifier of the second UE.

The processing unit 107 is further configured to: receive an RRC message sent by the second UE, obtain the second identifier corresponding to the first UE, and send the RRC message of the second UE by using the SRB of the first UE, where the RRC message includes the second identifier; or receive an RRC message that is sent by the base station by using the SRB of the first UE, where the RRC message includes the second identifier, obtain, by the first UE, the identifier that is of the second UE and that is corresponding to the second identifier, and send the RRC message to the second UE.

Correspondingly, this embodiment of the present invention further provides UE, including: a memory, an interface, and a processor.

The memory is configured to: implement a data storage function, and store program code. The processor is configured to implement a corresponding function of the processing unit. The processor may obtain the stored program code from the memory, to perform a corresponding procedure according to the obtained program code. The interface may implement specific functions of the sending unit and the receiving unit. Details are not described again.

The interface may be one or more of the following: a NIC that provides a wired interface, for example, an Ethernet NIC that can provide a copper interface and/or a fiber interface; or a NIC that provides a wireless interface, for example, a WLAN NIC.

The memory may be a volatile memory, for example, a RAM; or a non-volatile memory, for example, a flash memory, an HDD, or an SSD; or a combination of the foregoing types of memories.

The processor may be a CPU, or a combination of a CPU and a hardware chip. Alternatively, the processor may be an NP, or a combination of a CPU and an NP, or a combination of an NP and a hardware chip.

The hardware chip may be one or a combination of the following: an ASIC, an FPGA, or a CPLD.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk storage, a compact disc read-only memory, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may also be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for accessing a network by user equipment (UE), comprising:
sending, by a base station, a first message comprising a first identifier to a first UE, wherein the first message is used to manage a data radio bearer (DRB) of the first UE, so that the DRB of the first UE is used to transmit data of a second UE, and the first identifier is in a one-to-one correspondence with the second UE;
receiving, by the base station, a second message that is sent by a first core network entity and that is used to manage a bearer of the second UE, wherein the second message comprises an identifier of the first UE, a quality of service (QoS) requirement of a DRB that needs to be used by the second UE, and a first indication; and
determining, by the base station, according to the identifier of the first UE and further according to the first indication, that the first UE provides relay for the second UE, wherein the first indication instructs the second UE to access a network by using a relay.

2. The method according to claim 1, wherein:
the first identifier is indicates that data transmitted by using the DRB of the first UE belongs to the second UE; or
the first identifier is used to identify the second UE.

3. The method according to claim 1, wherein before sending the first message, the method further comprises:
in response to determining that a DRB meeting the QoS requirement exists in the first UE, determining, by the base station, to modify the DRB meeting the QoS requirement in the first UE, so that the DRB of the first UE is used to transmit data of the second UE; or in response to determining that no DRB meeting the QoS requirement exists in the first UE, setting up, by the base station on the first UE, a DRB meeting the QoS requirement.

4. The method according to claim 1, wherein before sending the first message, the method further comprises:
allocating, by the base station, the first identifier to the second UE; or
receiving, by the base station, a third message that is sent by the first core network entity and that comprises the first identifier, and obtaining, by the base station, the first identifier from the received third message.

5. The method according to claim 1, wherein after sending the first message, the method further comprises:
receiving, by the base station, data sent by using the DRB of the first UE, obtaining, by the base station, an S1 bearer that is of the second UE and that is corresponding to the DRB and the first identifier, and sending, by the base station, the data to a second core network entity by using the S1 bearer; or
receiving, by the base station, data sent by a second core network entity to the second UE by using an S1 bearer of the second UE, obtaining, by the base station, the first identifier and the DRB of the first UE that are corresponding to the S1 bearer, and sending, by the base station, the data by using the DRB of the first UE, wherein
a packet data unit (PDU) carrying the data that is sent by using the DRB of the first UE comprises the first identifier.

6. The method according to claim 5, wherein the obtaining, by the base station, the first identifier and the DRB of the first UE that are corresponding to the S1 bearer comprises:
obtaining, by the base station by using a stored first correspondence, the first identifier and the DRB of the first UE that are corresponding to the S1 bearer, wherein the first correspondence comprises an identifier of the DRB of the first UE, the first identifier, and an identifier of the S1 bearer of the second UE, the identifier of the DRB of the first UE is used to identify the DRB of the first UE, and the identifier of the S1 bearer of the second UE is used to identify the S1 bearer of the second UE.

7. The method according to claim 5, wherein the obtaining, by the base station, an S1 bearer that is of the second UE and that is corresponding to the DRB and the first identifier comprises:
obtaining, by the base station by using a stored first correspondence, the S1 bearer that is of the second UE and that is corresponding to the DRB and the first identifier, wherein the first correspondence comprises an identifier of the DRB of the first UE, the first identifier, and an identifier of the S1 bearer of the second UE, the identifier of the DRB of the first UE is used to identify the DRB of the first UE, and the identifier of the S1 bearer of the second UE is used to identify the S1 bearer of the second UE.

8. A base station (BS) comprising:
a processor;
a non-transitory memory storing a program to be executed in a processor, the program comprising instruction that when executed cause the processor to determine that first user equipment (UE) provides relay for a second UE; and
an interface coupled to the processor and configured to send a first message comprising a first identifier to the first UE, wherein the first message is used to manage a data radio bearer (DRB) of the first UE, so that the DRB of the first UE is used to transmit data of the second UE, and the first identifier is in a one-to-one correspondence with the second UE;
wherein the program further comprises instructions that, when executed in the processor, cause the processor to:
receive a second message that is sent by a first core network entity to manage a bearer of the second UE, wherein the second message comprises an identifier of the first UE, a quality of service (QoS) requirement of a DRB that needs to be used by the second UE, and a first indication; and
determine, by the base station according to the identifier of the first UE and the first indication, that the first UE provides the relay for the second UE, wherein the first indication instructs the second UE to access a network by using the relay.

9. The BS according to claim 8, wherein
the first identifier is used to indicate that data transmitted by using the DRB of the first UE belongs to the second UE; or
the first identifier is used to identify the second UE.

10. The BS according to claim 8,
wherein the program comprises further instruction that when executed cause the processor to:
modify a DRB meeting a QoS requirement in the first UE when the processor determines that the DRB meeting the QoS requirement exists in the first UE, so that the DRB of the first UE is used to transmit data of the second UE; or set up a DRB meeting the QoS requirement on the first UE when the processor determines that no DRB meeting the QoS requirement exists in the first UE.

11. The BS according to claim 8, wherein the program comprises further instruction that when executed cause the processor to:

allocate the first identifier to the second UE; or obtain the first identifier from a third message that is sent by a first core network entity.

12. The BS according to claim 8, wherein the interface is further configured to:

receive data that is sent by using the DRB of the first UE; and send the data to a second core network entity by using an S1 bearer that is of the second UE and that is corresponding to the DRB and the first identifier.

13. The BS according to claim 12, wherein the program comprises further instruction that when executed cause the processor to:

obtain, by using a stored first correspondence, the S1 bearer that is of the second UE and that is corresponding to the DRB and the first identifier, wherein the first correspondence comprises an identifier of the DRB of the first UE, the first identifier, and an identifier of the S1 bearer of the second UE, the identifier of the DRB of the first UE is used to identify the DRB of the first UE, and the identifier of the S1 bearer of the second UE is used to identify the S1 bearer of the second UE.

14. A non-transitory memory storing a program to be executed in a processor within a base station, the program comprising instruction that when executed cause the base station to:

sending a first message comprising a first identifier to a first UE, wherein the first message is used to manage a data radio bearer (DRB) of the first UE, so that the DRB of the first UE is used to transmit data of a second UE, and the first identifier is in a one-to-one correspondence with the second UE;

receiving a second message that is sent by a first core network entity and that is used to manage a bearer of the second UE, wherein the second message comprises an identifier of the first UE, a quality of service (QoS) requirement of a DRB that needs to be used by the second UE, and a first indication; and determining, according to the identifier of the first UE and further according to the first indication, that the first UE provides relay for the second UE, wherein the first indication instructs the second UE to access a network by using a relay.

15. The non-transitory memory storing a program of claim 14, wherein the first identifier is used to indicate that data transmitted by using the DRB of the first UE belongs to the second UE; or the first identifier is used to identify the second UE.

16. The non-transitory memory storing a program of claim 14, wherein the program comprises further instruction that when executed cause the base station to:

modify a DRB meeting a QoS requirement in the first UE when the processor determines that the DRB meeting the QoS requirement exists in the first UE, so that the DRB of the first UE is used to transmit data of the second UE; or set up a DRB meeting the QoS requirement on the first UE when the processor determines that no DRB meeting the QoS requirement exists in the first UE.

17. The non-transitory memory storing a program of claim 14, wherein the program comprises further instruction that when executed cause the processor to:

allocate the first identifier to the second UE; or obtain the first identifier from a third message that is sent by a first core network entity.

18. The non-transitory memory storing a program of claim 14, wherein the program comprises further instruction that when executed cause the base station to:

receive data that is sent by using the DRB of the first UE; and send the data to a second core network entity by using an S1 bearer that is of the second UE and that is corresponding to the DRB and the first identifier.

19. The non-transitory memory storing a program of claim 18, wherein the program comprises further instruction that when executed cause the base station to:

obtain, by using a stored first correspondence, the S1 bearer that is of the second UE and that is corresponding to the DRB and the first identifier, wherein the first correspondence comprises an identifier of the DRB of the first UE, the first identifier, and an identifier of the S1 bearer of the second UE, the identifier of the DRB of the first UE is used to identify the DRB of the first UE, and the identifier of the S1 bearer of the second UE is used to identify the S1 bearer of the second UE.

* * * * *